United States Patent

Knollman et al.

[15] 3,660,611

[45] May 2, 1972

[54] PROGRAM CONTROLLED KEY TELEPHONE SYSTEM FOR AUTOMATIC SELECTION OF A PRIME LINE

[72] Inventors: Dieter John Henry Knollman, Guttenberg, N.J.; Robert Forcier Metz; Howard Lloyd Reynolds, both of Boulder, Colo.

[73] Assignee: Bell Telephone Laboratories, Incorporated, Murray Hill, Berkeley Heights, N.J.

[22] Filed: June 5, 1970

[21] Appl. No.: 43,916

[52] U.S. Cl. ....................179/18 ES, 179/99

[51] Int. Cl. ....................H04m 1/00

[58] Field of Search ....................179/18 ES, 99

[56] References Cited

UNITED STATES PATENTS 3,385,935 5/1968 Anderson et al....................179/99

*Primary Examiner*—Kathleen H. Claffy
*Assistant Examiner*—Thomas W. Brown
*Attorney*—R. J. Guenther and James Warren Falk

[57] ABSTRACT

A program controlled key telephone system which includes line modules and station modules for providing the interface circuitry between PBX/CO lines and stations is disclosed. System functions are controlled by a multiphase clock which generates a reiterative list of binary coded signals based on a master program. The system is arranged to control the connection of a prime line or previously connected line to each station set going off-hook without depressing a key.

12 Claims, 22 Drawing Figures

United States Patent
Knollman et al.
[15] 3,660,611
[45] May 2, 1972
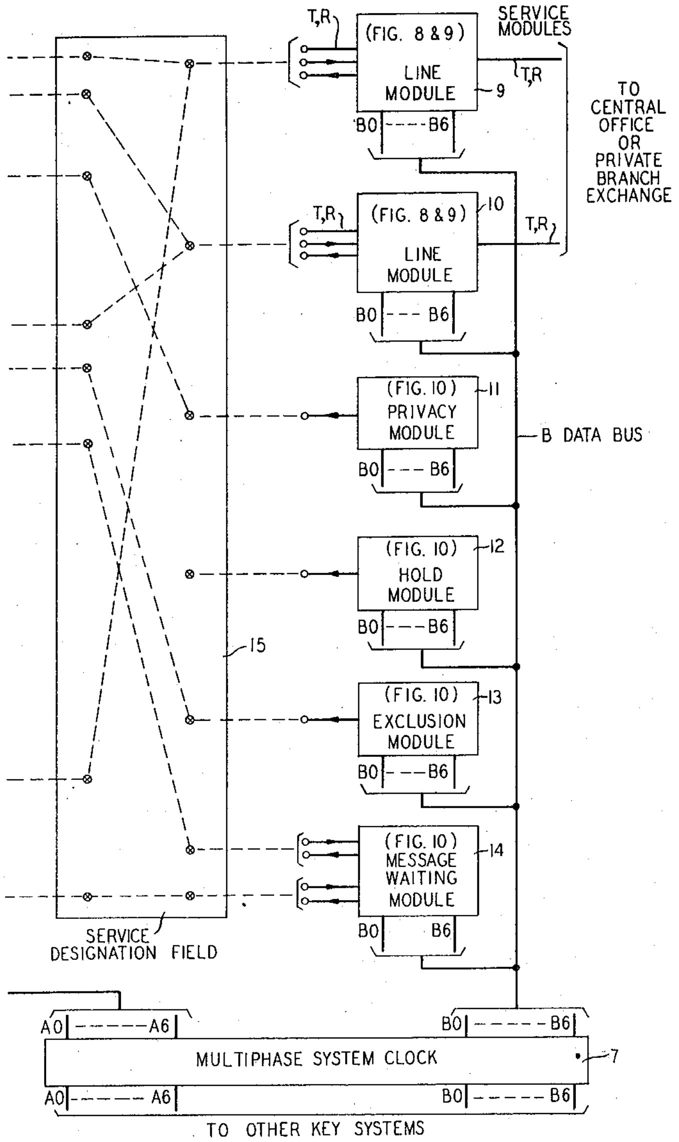

INVENTORS D. J. H. KNOLLMAN
R. F. METZ
H. L. REYNOLDS
BY Henry J. Walsh
ATTORNEY

J-K FLIP-FLOP

TRUTH TABLE

| J | K | OUTPUT AT TERM "1" |
|---|---|---|
| 0 | 1 | 0 |
| 1 | 0 | 1 |
| 1 | 1 | $\bar{Q}$ (TOGGLE) |
| 0 | 0 | Q (NO STATE CHANGE) |

D FLIP-FLOP

TRUTH TABLE

| D | OUTPUT AT TERM "1" |
|---|---|
| 1 | 1 |
| 1 | 0 |

S-C FLIP-FLOP

| S | C | OUTPUT AT TERM "1" |
|---|---|---|
| 0 | 1 | 0 |
| 1 | 0 | 1 |
| 1 | 1 | Q (NO STATE CHANGE) |
| 0 | 0 | $\bar{Q}$ (TOGGLE) |

SHIFT REGISTER

TRUTH TABLE
FOR DECODER 90

| A | B | C | OUTPUT SIGNAL AT TERMINAL |
|---|---|---|---|
| 0 | 0 | 1 | 1 |
| 0 | 0 | 0 | 2 |
| 1 | 0 | 0 | 3 |
| 1 | 1 | 0 | 4 |
| 0 | 1 | 1 | 5 |
| 1 | 0 | 1 | 6 |
| 1 | 1 | 1 | 7 NOT USED |
| 0 | 1 | 0 | 8 NOT USED |

TRUTH TABLE FOR ALL
DECODERS EXCEPT
DECODER 90

| A | B | C | OUTPUT SIGNAL AT TERMINAL |
|---|---|---|---|
| 0 | 0 | 0 | 0 |
| 1 | 0 | 0 | 1 |
| 0 | 1 | 0 | 2 |
| 0 | 1 | 1 | 3 |
| 0 | 0 | 1 | 4 |
| 1 | 0 | 1 | 5 |
| 0 | 1 | 1 | 6 |
| 1 | 1 | 1 | 7 |

MULTIPLEXER

ENABLE SIGNALS

| ENABLE SIGNALS A | B | C | INPUT TERM. NO. CONNECTED TO TERM. D |
|---|---|---|---|
| 0 | 0 | 0 | 0 |
| 1 | 0 | 0 | 1 |
| 0 | 1 | 0 | 2 |
| 1 | 1 | 0 | 3 |
| 0 | 0 | 1 | 4 |
| 1 | 0 | 1 | 5 |
| 0 | 1 | 1 | 6 |
| 1 | 1 | 1 | 7 |

MULTIPLEXER

ENABLE SIGNALS

| ENABLE SIGNALS A | B | INPUT TERM. NO. CONNECTED TO TERM. D |
|---|---|---|
| 0 | 0 | 0 |
| 1 | 0 | 1 |
| 0 | 1 | 2 |
| 1 | 1 | 3 |

PROGRAM CONTROLLED KEY TELEPHONE SYSTEM FOR AUTOMATIC SELECTION OF A PRIME LINE

BACKGROUND OF THE INVENTION

This invention relates to program controlled key telephone systems, and more particularly, to an arrangement for automatically connecting prescribed lines to a key system without the necessity for a button depression.

A key telephone system enables several key-equipped telephone station sets to share access to two or more individual telephone lines by proper manipulation of keys. Depression of a key activates an individual line circuit provided in most conventional key systems for completing a voice path between a handset of the associated station and the selected line. In those systems the "pick-up" key is usually a mechanically locking-type key equipped with a lamp which projects light through a translucent head of the key.

Each time a key station subscriber originates a call he is required in prior art key systems to lift the handset from its cradle and depress one of the locking-type keys. Ordinarily, the subscriber originates such calls consistently on the same line which is referred to as the primary, or prime, line. This enables an accurate accounting to be made of the call traffic and charges for calls originated by the subscriber. Subordinate lines are terminated at the set principally for answering calls which would otherwise go unanswered.

The necessity for the key operation on call originations from a multi-line key station is unwarranted and time consuming. Moreover, experience has demonstrated that the key itself, which is subjected to continued depressions, is a source of noise generated at the key contacts which close the transmission path.

SUMMARY OF THE INVENTION

The foregoing deficiencies in prior art key systems are overcome in accordance with a specific illustrative embodiment of the invention which includes a plurality of functional circuit modules, each embodying separate data processing capabilities and a multi-phase system clock which connects to all units to control system operations. The system clock generates binary encoded instruction signals based on a master program which is stored in the clock. A subroutine of the program controls the automatic connection of prime lines to off-hook station sets without the necessity for a key depression.

The instructions of the subroutine direct that the off-hook station set be connected to the prime line only on the condition that the set has been on-hook previously for more than nominally five seconds. If an off-hook signal is detected within the five seconds, the off-hook station set is reconnected to the last line used.

This "prime line selection" program subroutine follows other subroutines in which station sets are scanned for switchhook status information and button depression activity. The program instructions for station set scanning precede a special program subroutine for controlling disconnect of existing line connections. The latter contains two groups of instructions which are dependent on the length of time a station set on-hook condition persists. When the station set initially goes on-hook, the instructions of this subroutine block a switching network of a station module for releasing any previously established line connection. If the station set on-hook persists for more than five seconds, the identity (button code) of the previously connected line is erased and a special code, a no connect code, is stored in the station module.

The prime line selection subroutine follows the disconnect and scan subroutines. If an off-hook condition without a button depression is determined, the instructions of this routine cause the button code of the prime line, or of the previously used line, to be temporarily stored in a button register. The choice of the line to be connected to the station set, therefore, is dependent essentially on whether or not a no connect code is stored during prior disconnect subroutines.

Having chosen the particular line to be used, a signal (intermodule) is forwarded by the station module, if it remains off-hook, to the line module associated with the selected line. In this manner, the line activity is determined before making the connection; and if the line is available for a connection, the line module returns an appropriate signal. This routine also contains network connecting instructions for controlling the station module network if all necessary conditions are met.

Accordingly, it is an aspect of our invention that circuitry in a key telephone system automatically connect an off-hook station to the line last connected thereto without the necessity for depressing the usual key button associated with that last connected line.

It is a further aspect of our invention that one of the lines appearing at the station in the key telephone system be a prime line and that circuitry control the connection of the station automatically to that prime line without the necessity of depressing the usual key button associated therewith if the station has been disconnected, i.e., off-hook, from the last connected line for more than a prescribed time interval.

More specifically, it is a feature of our invention that the identity code of the last connected line initially be stored but that, after the aforementioned prescribed time interval, the identity code of the prime line be stored in place of the identity of the last connected line.

The above and other objects and features of my invention will be more fully understood from the following description when read with reference to the drawings.

BRIEF DESCRIPTION OF THE DRAWING

FIG. 10 shows various feature modules;

FIG. 12 shows the manner in which FIGS. 2–7 are to be arranged;

FIG. 13 shows the manner in which FIGS. 8–10 are to be arranged; and

FIG. 14 shows the arrangement of FIGS. 1A and 1B.

GENERAL DESCRIPTION

Figure 1A:
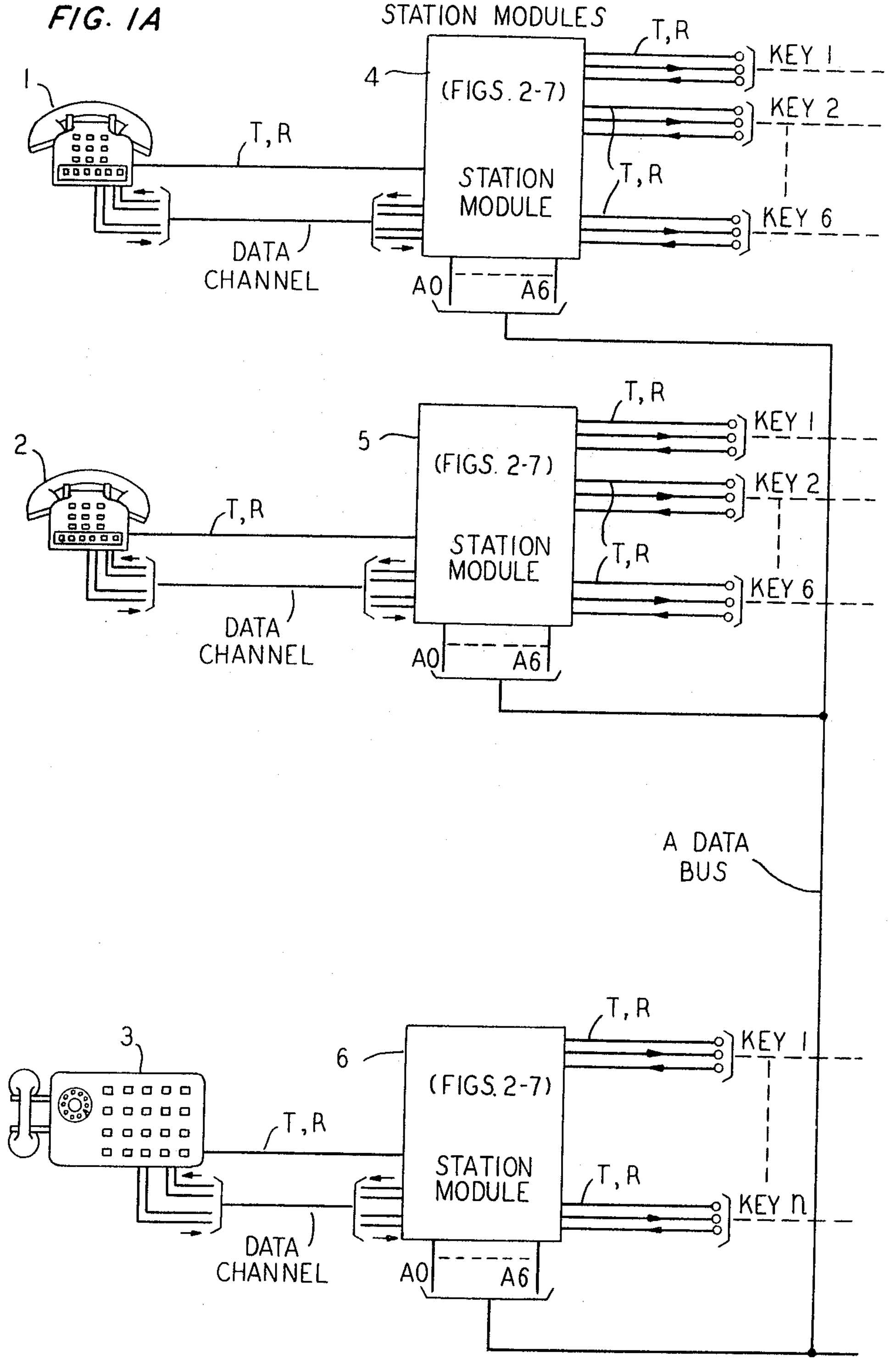
FIGS. 1A and 1B depict a simplified block diagram of one specific illustrative embodiment of the invention and show the manner in which modules may be cross-connected.
Figure 1B:
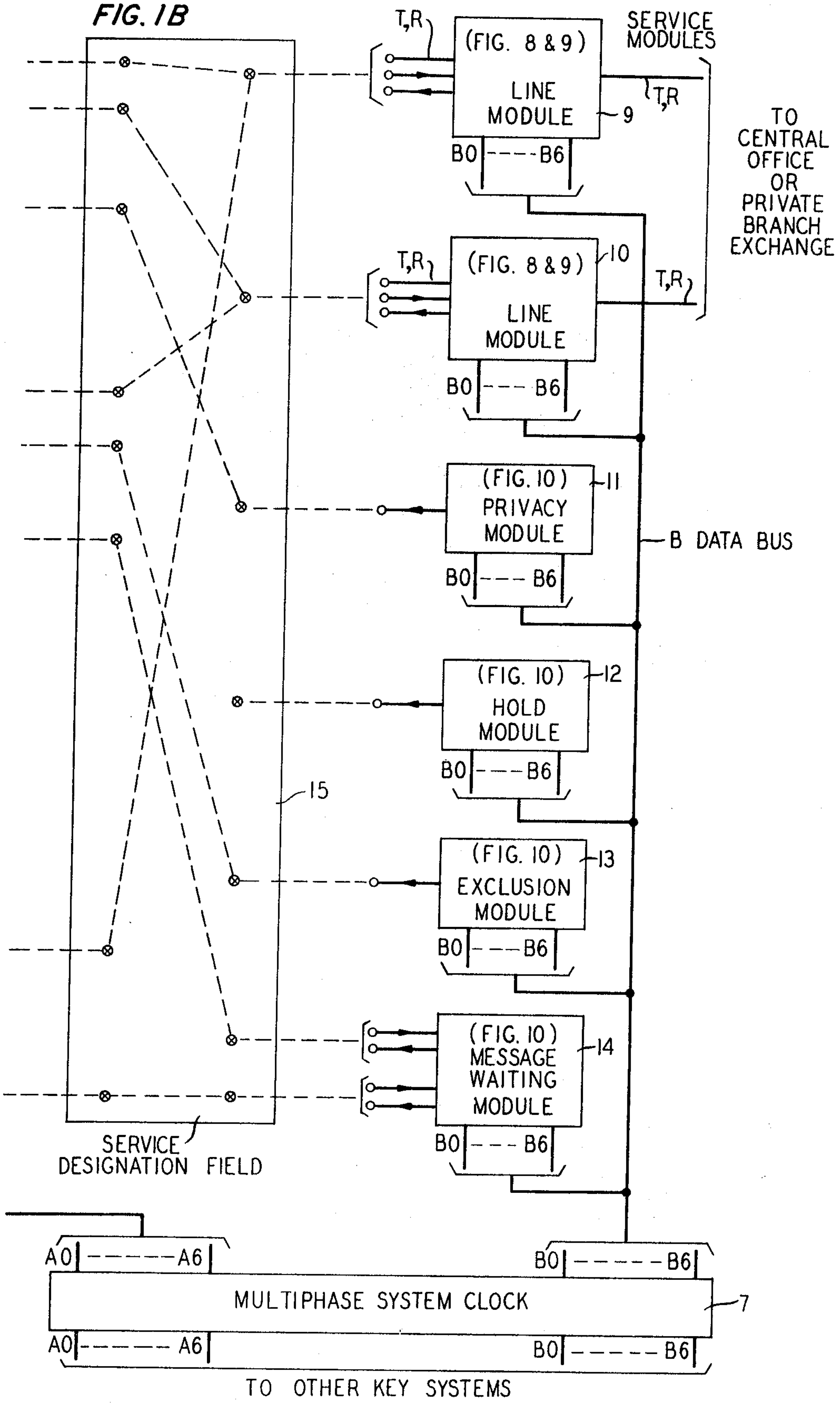

As seen in FIGS. 1A and 1B, the major elements of this embodiment of the invention include station modules 4, 5, and 6 associated with respective station sets 1 and 2 and "call director" set 3; line modules 9 and 10 associated with separate lines from a central office or Private Branch Exchange (PBX); and a service designation field 15 through which modules are interconnected. Various services are provided by service modules such as privacy module 11, hold module 12, exclusion module 13, and message waiting module 14. The whole arrangement is controlled by multi-phase system clock 7 which generates program controlled instruction signals on the "A DATA BUS" the "B DATA BUS."

In this embodiment of the invention wherein station sets 1 and 2 are each provided with six non-locking push buttons, any one of them can be assigned to a particular line, or feature, module. Referring to station module 4, the following illustrative assignment is shown: buttons 1 and 2 to C.O./PBX lines (modules 9 and 10), and button 6 to the privacy feature (module 11). Station set 2, as may be seen by reference to station module 5 has button 1 assigned to the same line (module 10) as button 2 of set 1, button 2 to the exclusion feature (module 13), and button 6 to the message waiting feature (module 14). Button 1 of set 3 is associated with the same line (module 9) appearing at button 1 of set 1, and button *n* of set 3 controls the message waiting feature (module 14).

Upon closer examination of the service designation field 15, it may be observed that a simplified wiring pattern emerges. Button positions of a station set are associated with particular lines by interconnecting the line module for each of the lines with the associated station module using four wires—two of the wires designated T and R are for the voice transmission and the other two wires shown with arrowheads are for intermodule signalling. To assign a feature operation to a button, a single pair of wires is necessary to cross-connect the button position of the station module with a feature module. It is to be noted that with the exception of the message waiting module 14, only a single feature module, modules 11–13, is required to serve the entire system and provide the feature service to all station sets.

Station sets 1 and 2, and call director set 3 connect to separate station modules 4, 5, and 6 via a six-wire path. Conductors T and R of that path form a conventional voice path and the remaining two pairs of conductors are for sending and receiving lamps, ringer, button depression and switch-hook status data signals. The circuitry (not shown) of station sets 1 and 2, and of set 3 responds to bipolar signals on the data channels for updating the lamps and ringer indication of the set, converts the received signals and returns to station modules 4, 5, and 6 bipolar encoded signals representing the button and switch-hook status at the set. Power for operating the station set circuitry is supplied over the data channels.

Multi-phase system clock 7 comprises a semipermanent memory for storing a list of program instruction signals as well as signal sending equipment for one-at-a-time transmission of the stored signals, or words, in a binary encoded format via "A DATA BUS" and "B DATA BUS." The circuitry (not shown) of clock 7 is conventional and may comprise, for example, a drum-type memory, a drum scanner circuit and a signal transmitter coupled to the scanner circuit. Each instruction, or word, comprises seven bits which are forwarded in parallel on conductors A0–A6 and B0–B7 and received at all modules simultaneously.

Considering now the circuitry of station modules 4, 5, and 6 in greater detail, it comprises:

a. a system clock decoder,
b. an incoming data register,
c. a function calculator,
d. an outgoing data transmitter,
e. a switching network,
f. a switch-hook and time-out circuit,
g. a button code and memory register, and
h. a service input/output intermodule signal sending and receiving circuit.

Each of the above circuits may be combined and controlled to operate in any one of various sequences by program instructions on the "A DATA BUS." Moreover, the circuit operations preformed by each individual circuit may be altered and directed by the same instructions. One of the most significant circuits of the station module is the function calculator which expands the operational range of station modules 4, 5, and 6 in response to program signals. The calculator is connected to eight internal circuit variables (circuit conditions); and upon appropriate instructions, it can serially select a series of these variables and perform combinatorial logic thereon. These variables can be derived from connected service modules to expand the possible circuit conditions which can be logically combined. As a result, many operations can be facilely programmed and new service conditions accommodated by simple program changes.

Line modules also respond to program instruction signals on the "B DATA BUS" for updating supervisory, hold and "A" lead information. This module is equipped with various timing devices for timing the interval between ringing signal bursts, the interval after receipt of the first ringing signal burst (delayed ringing), and the interval following receipt of an on-hook signal while on hold for controlling the release of the line module.

Feature modules, such as the Privacy, Hold and Exclusion Modules 11, 12, and 13, contain coded gates which control the transmission of a signal to connected station modules upon receipt of a special program instruction. The transmitted signal is sent at various times during the program and its interpretation is dependent upon the sub-routine group of instructions of which the special program instruction is a part.

DISCRETE LOGIC CIRCUITS

The presently disclosed system makes extensive use of Diode Transistor Logic (DTL) and Resistor Transistor Logic (RTL) in which single transistor stages are used as an inverter, an AND gate, or an OR gate, depending upon the nature of the input signals applied thereto and the functions to be performed by this stage. FIGS. 11A, 11B, 11C and 11D disclose the details and respective symbols for each logic gate and flip-flop employed in the system.

Figure 11A:
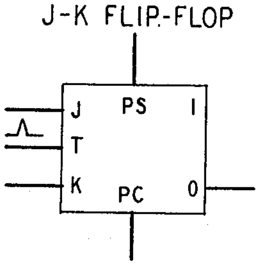
FIGS. 11A to 11H describe the drawing conventions for gates, multiplexers, decoders, and flip-flops, together with truth tables therefor.

The truth table for a J-K type flip-flop is shown in FIG. 11A. Positive going transient pulses on terminal T, referred to ordinarily as toggle pulses, activate the flip-flop into different states depending upon the level of the signals on terminals J and K. If the state of terminals J and K are one ("1") when the toggle voltage is applied to terminal T, the flip-flop switches so as to form the complement of the previously stored signal. The latter is indicated in the truth table as a $\overline{Q}$. The presence of zeroes at terminals J and K concurrent with a toggle voltage at terminal T causes the flip-flop to remain in its original state. Terminals PS and PC, asynchronous inputs, respectively set and clear the flip-flop to establish initial states. Additional details of the operation of a J-K flip-flop may be obtained by reference to Logic Design of Digital Computers, by Montgomery Phister, Jr., page 128 et seq.

Figure 11B:
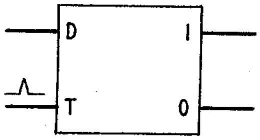
Figure 11C:
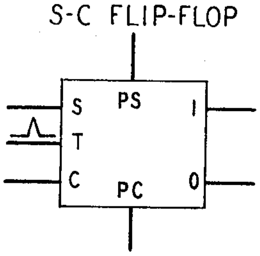

A D type flip-flop is activated by toggle pulses at terminal T to produce the outputs at terminal 1 indicated in the truth table of FIG. 11B. It may be seen the level at terminal D is reflected without inversion at terminal 1 and complemented at terminal O. See the aforementioned text by Montgomery Phister, Jr., page 126.

A S-C flip-flop logically functions in the same manner as a J-K flip-flop with one important difference. If zeroes appear at terminals S and C concurrent with a toggle voltage at terminal T, the complement of the previously stored signal in the flip-flop is formed at its output terminals 0 and 1. From reference to the truth table in FIG. 11C this may be readily seen.

Figure 11D:
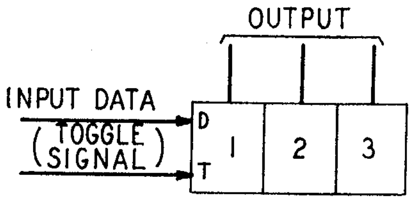
Figure 11E:
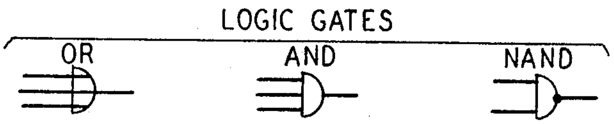

Symbols for AND, NAND, and OR gates are shown in FIG. 11E. Truth tables for these gates are disclosed in the Phister text.

Figure 11F:
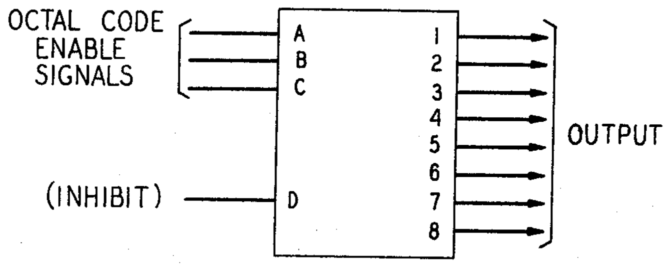
Figure 11G:
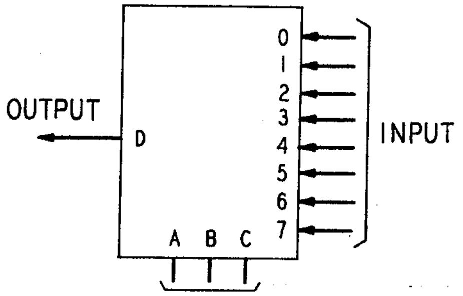
Figure 11H:
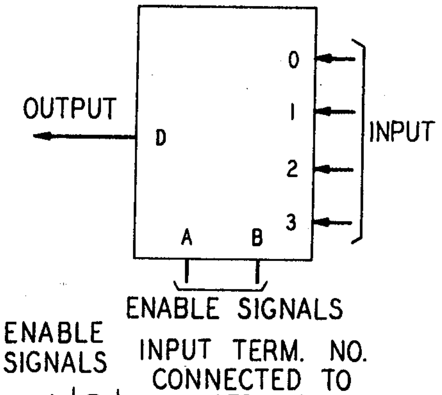

A multiplexer, FIG. 11G, is a device controlled by an octal code at its terminals A, B, and C for connecting any one of its terminals 0–7 to terminal D. The relationship between the octal code, in binary form, and the terminal connected to terminal D is shown in the accompanying table. FIG. 11H discloses the symbol and truth table for a binary code controlled multiplexer.

A shift register, such as the one shown in FIG. 11D, stores binary coded signals. The binary signals appearing at terminal D are "shifted" into the cell marked "1," one at a time, for each positive going pulse appearing at terminal T. As each new signal is introduced into cell 1, the previously stored binary signal is shifted into cell 2 and from thence into cell 3. The vertical lines shown connected to cells 1–3 represent the outputs of each cell.

An Octal Decoder, FIG. 11F, forms a "1" signal at its output terminals 1–8 in accordance with octal encoded signals at terminals A, B, C, and D. In the idle state, outputs at terminals 1–8 are zero; and upon the occurrence of a predetermined octal binary code at terminals A, B, and C, one of the terminals 1–8 is high ("1"). Terminal D is effectively used for inhibiting signals. The presence of a one at terminal D raises the octal code equivalent above the number 8, and thus there is no output.

Insofar as it has been possible, one ("1") signals are used to enable or to activate circuits. When it is necessary to form the inversion or complement of the signal, the symbolic convention used is a dot. This dot may be shown at the intersection of an input lead and gate, or output lead and gate. For example, in FIG. 3, AND gate 97 has an inversion symbol at its output; thus a one signal at its input will produce a zero signal at the input of the succeeding gate 96. Inversion symbols are also used on decoders, multiplexers, and shift registers; and when so used, their meaning is consistent with the above description.

DETAILED DESCRIPTION

It is considered that the basic principles of the invention can best be introduced by considering the specific embodiment of the key telephone system having a distributed processor organization. The first consideration will be an analysis, module by module, of the logic circuits contained in each separate module. Next, the basic program instruction signals in the master program will be considered together with the related module circuit action. Following this, there will be presented a complete program for performing the operations of scanning lines and station sets, detecting line requests, and establishing call connections. The discussion also includes special program instructions for feature operations.

STATION MODULE (FIGS. 2–7)

This module is the focal point for operations within the system because it provides an interface between a telephone set and various service modules including line modules. The majority of the logic control circuitry which may be programmed to operate in a variety of different ways is contained within this module.

Figure 2:
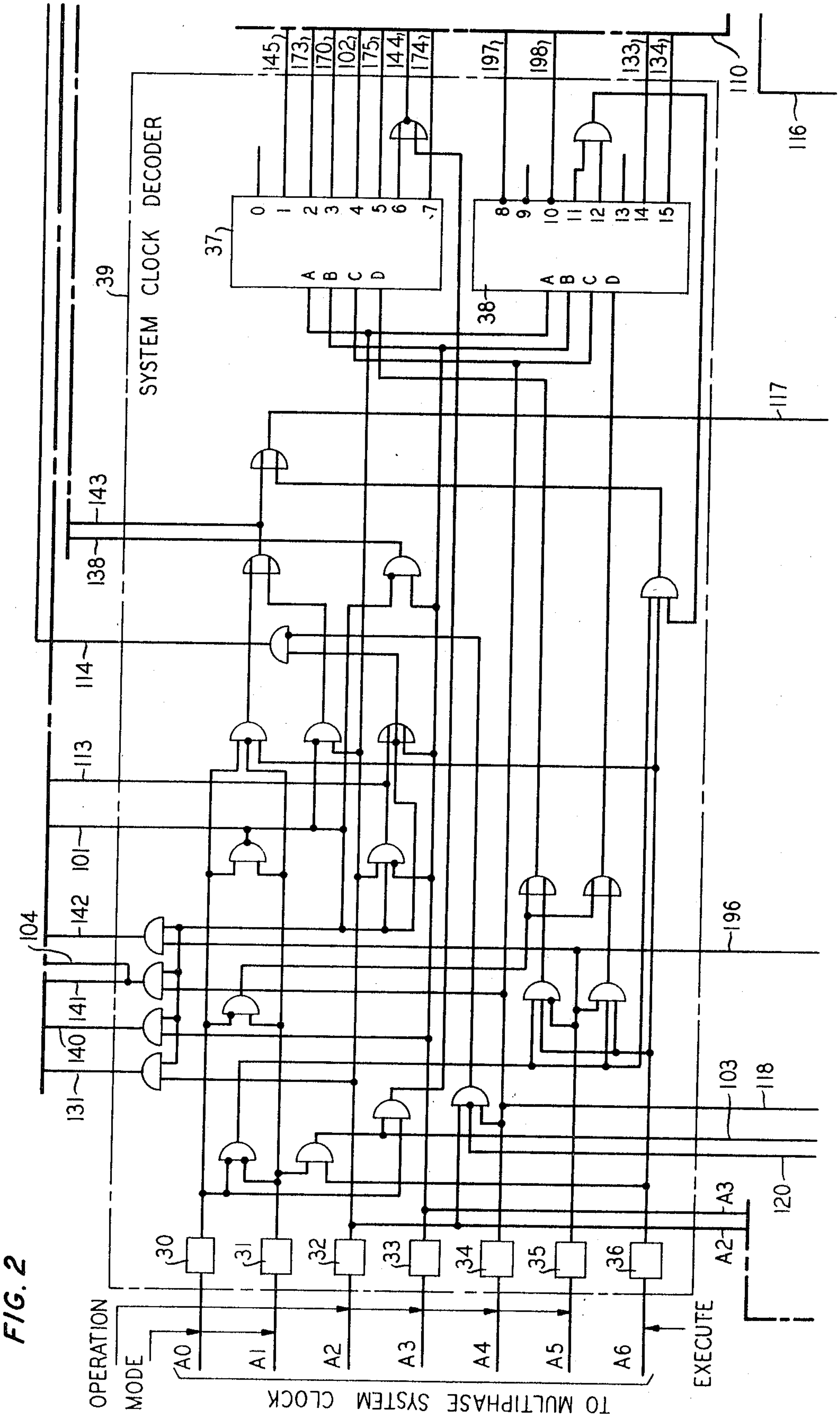
FIG. 2 shows the system clock decoder for a station module.

The station module, like every other module in the system, connects to a signal bus ("A" bus) to receive instruction signals from the multi-phase system clock 7. With reference to FIG. 2, seven wires comprising the "A" bus are depicted on the left-hand side of the drawing and are labeled A0–A6.

The first sub-circuit of the station module which we will consider is the system clock decoder 39 shown entirely in FIG. 2. It functions to decode in a predetermined manner the binary data on leads A0–A6 for controlling local module circuits. The main purpose of decoder 39 is to reduce the number of leads in the "A" bus. Buffer circuits 30–36, each including a line isolator and amplifier, are inserted between the "A" bus connection and the logic gates of decoder 39. The isolator, which may typically be a diode or transistor junction, prevents false signals generated within the module circuitry from becoming impressed on the "A" bus leads and thereby rendering all modules tied in common to this same bus inoperative. The amplifier also increases the signal level of the voltage applied on leads A0–A6.

The system decoder essentially comprising AND gates wired together in a particular pattern to translate received word signals on leads A0–A6 into signals on various leads shown exiting at the top, right-side and bottom of FIG. 2. Octal Decoders 37 and 38 are controlled by clock signals applied to their respective terminals A, B, and C for generating a signal on one of the leads in cable 110. The respective terminals D of decoders 37 and 38 always contain the logical compliment with respect to each other of the derived signals. Thus, in effect, when decoder 37 is inhibited, decoder 38 is enabled and vice-versa.

Figure 4:
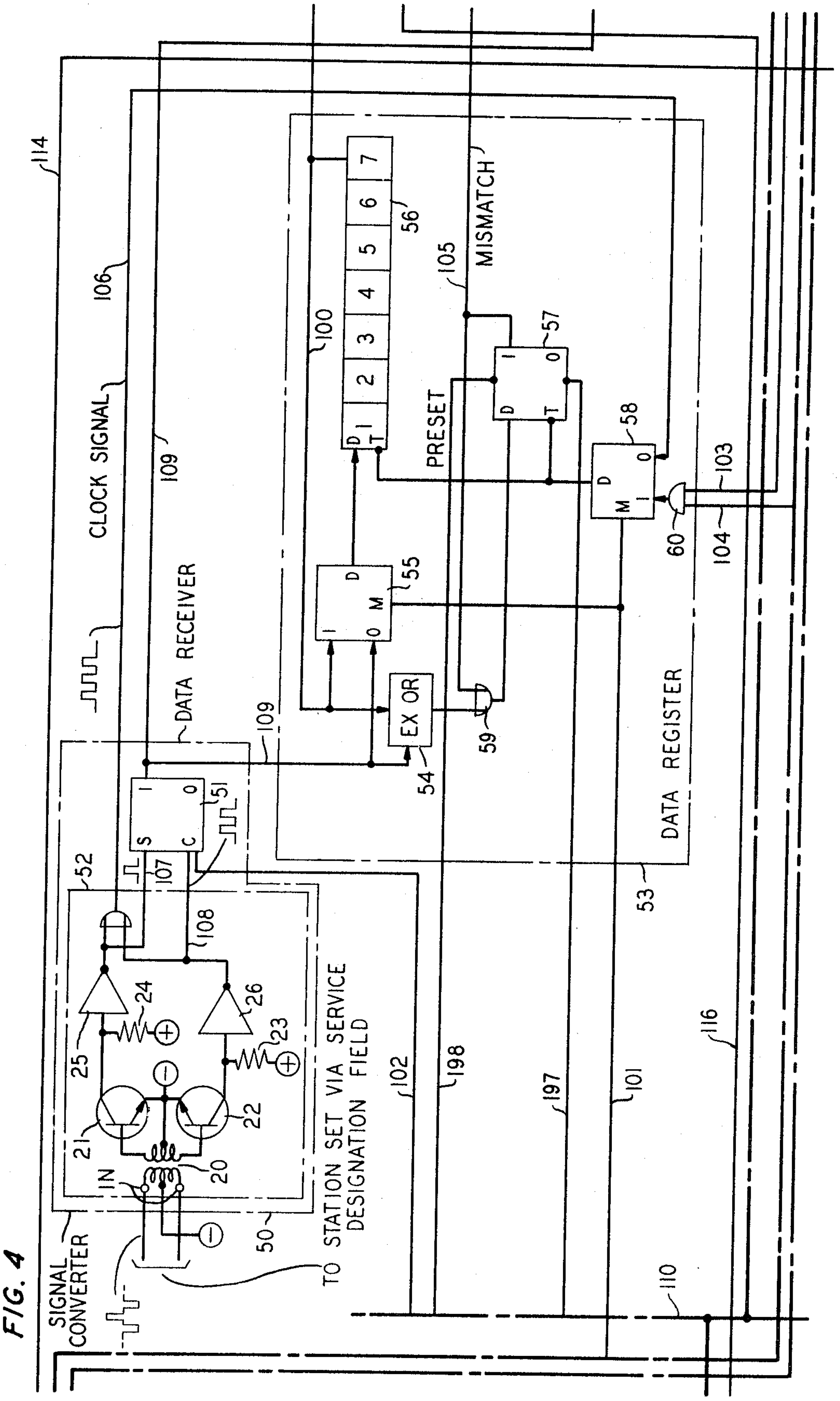
FIG. 4 shows a signal receiver and store for data signals forwarded by a station set.

Referring to FIG. 4, it depicts a Data Receiver 50 and a Data Register 53 for detecting and recording information transmitted from the station set. Station sets transmit bipolar pulses (a sample shown in the figure) which are received at terminal IN of converter 52. Converter 52 generates a clock signal derived from the transmitted bipolar signals, which clock signal is forwarded on lead 106 to Data Register 53 for synchronizing the circuit operations with the incoming pulses. Converter 52 also converts and separates the bipolar pulses into separate unipolar pulses shifting between level 0 (ground) and level 1 (positive level). The separated signals are connected via leads 107 and 108 to terminals S and C (set and reset) of flip-flop 51. In this manner, each negative going pulse resets and each positive going pulse sets the state of flip-flop 51.

The incoming bipolar pulses are received by a transformer 20 which couples the signal to gate circuitry comprising transistors 21 and 22. Transistor 21 is conducting on positive pulses and transistor 22 is conducting on negative pulses.

Figure 5:
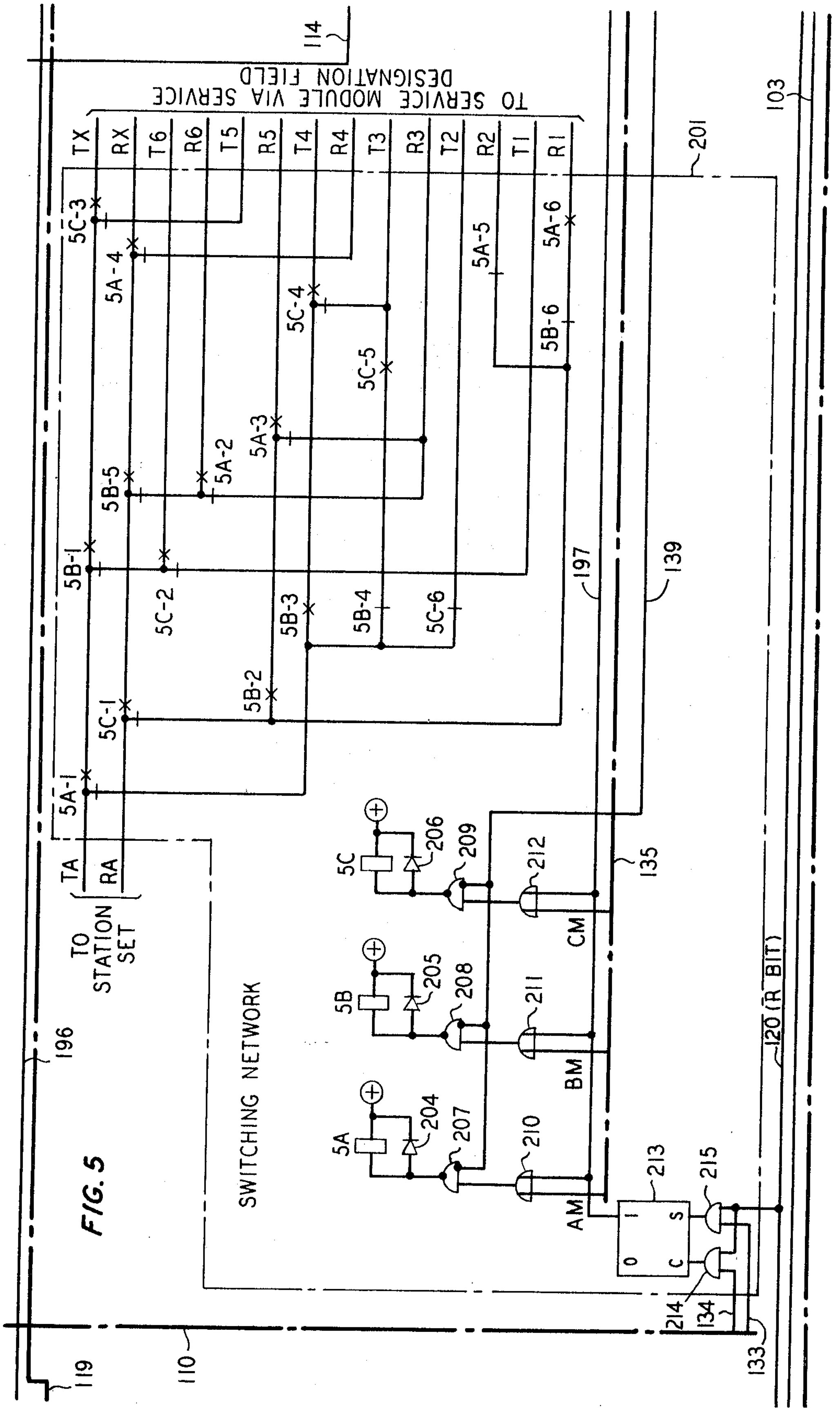
FIG. 5 shows a switching network for connecting a line from the station set to any cross-connected line module.

Before discussing in greater detail the operations of the remaining circuits disclosed in FIG. 5, it is opportune to first consider the nature of the signals forwarded by the station set. The station set forwards a seven-bit word which indicates the status of the switch hook and six buttons located in the base of the set. The rightmost bit of the transmitted word corresponds to the "switch hook bit." The received data is recorded in the same order as transmitted, in data register 53. For purposes of this present illustration, it will be assumed that the data is transmitted in the following order: Switch hook bit, status of button 6, button 5, button 4, button 3, button 2, and button 1.

Figure 6:
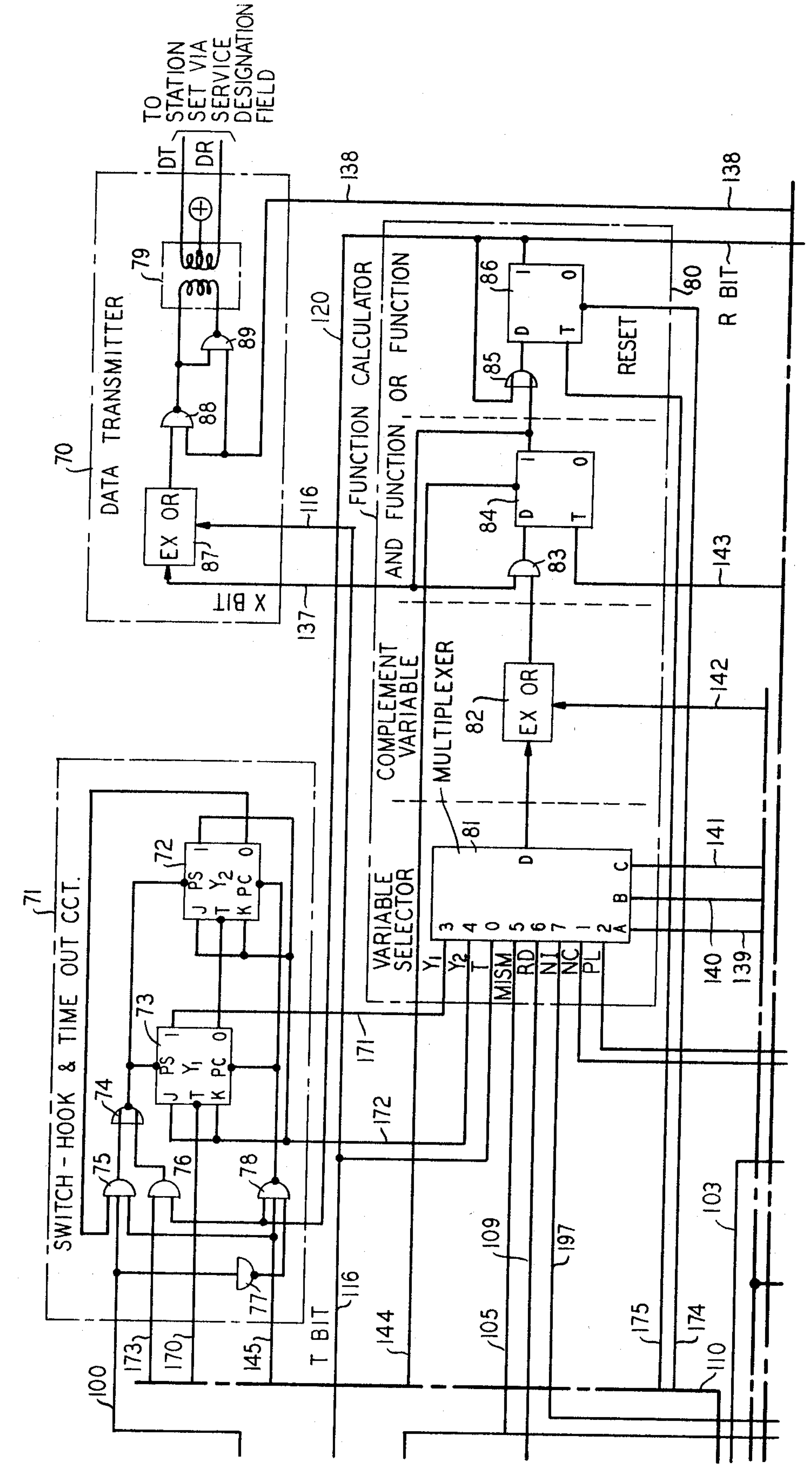
FIG. 6 shows a switch-hook time-out circuit, a data transmitter and the function calculator.

The center tap of the input winding of transformer 20 is connected to negative battery. Referring momentarily to FIG. 6 and therein to Data Transmitter 70, it may be seen that center tap of transformer 79 having windings connecting to the station set, connects to positive battery. In this manner, the station set equipment is powered over the same channels as signals are transmitted and received. Due to the winding orientation of transformers 20 and 79, the flux created by the DC current flow is cancelled out in the primary windings. Thus the transformer does not saturate and the signals transmitted are not distorted.

Upon the receipt of appropriate program instruction signals, the circuitry of Data Receiver 50 and Data Register 53 are combined logically to perform two separate operations. In the first operation, data transmitted by the station set is converted into unipolar information by receiver 50 and compared in register 53 against the information previously transmitted by the station set and presently recorded in shift register 56. This operation is performed to determine a change of state of any button at the station set. The second operation which can be performed by the combined circuitry of receiver 50 and register 53 is the location of a 1 bit stored in register 56. This operation is performed when it is desired to identify the specific button having a change of state.

As noted previously, on each scan the station set forwards a seven-bit word denoting the status of the switch hook and the six buttons at the set. Let us assume that there is at present stored in shift register 56 a seven bit signal which comprises all 0s. Recall that the receipt of a "1" bit signal denotes a button depression; and if it is received at the beginning of the bit stream, it denotes an off-hook state. Accordingly, the assumed state, all 0s, indicates an idle condition of all buttons and an on-hook state of the switch hook. The output (terminal "1") of flip-flop 51 may be coupled to terminal D of register 56 by multiplexer 55.

When it is desired to receive station set signals and compare those signals against the signals stored in register 56, the system program decoded by decoder 39 provides a signal on lead 101 such that multiplexers 55 and 58 are toggled to 0. Thus it may be seen that synchronizing clock pulses on lead 106 are coupled to register 56 resulting in the shifting of the data from left to right, or from cells 1 to 7. As the data in register 56 shifts, each stored unit, in the present example 0s, is coupled to lead 100 and to Exclusive OR gate 54. Concurrently, the received data, converted to unipolar information, is coupled by a lead 109 to gate 54 and therein compared. When a mismatch, or difference, between the compared signals occurs, gate 54 forwards a signal via OR gate 59 to set flip-flop 57. The signals on lead 109 are also coupled via multiplexer 55 to register 56 for storage therein. It is to be noted that the registration of a mismatch in flip-flop 57 and the shifting of the register information in register 56 are controlled by the derived clock signals which toggle those devices. Thus as the priorly stored information in register 56 is shifted out of register 56 and connected to lead 100, the incoming data is stored in its place.

The circuitry of Data Receiver 50 and Data Register 53, as previously remarked, can also be used to locate the bit position of a "1" stored in register 56. It will be recalled that a "1" corresponds to the off-hook state of a switch hook or a button depression signal. To accomplish this operation, a program instruction manifest by a particular word appearing on leads A0–A6 controls a signal level in FIG. 4 of leads 101, 102, and 104. The signal level on lead 101 toggles multiplexers 55 and 58 to a "1." In addition, the incoming data which may or may not be transmitted by a station set at the time that this operation is initiated, is blanked, or set to 0, by the signal level on lead 102 which maintains flip-flop 51 in the reset, clear, state. Setting the incoming data to zero is necessary to prevent the unwanted input signals from interfering with this operation.

The search for the one bit in a word stored in register 56 is initiated by a shift clock pulse which is continuously available on lead 103 and by an enabling signal on lead 104. The shift clock signals are comparable to those of the derived clock signals priorly discussed on lead 106. They are gated by multiplexer 58 into the register 56 causing the stored information to be coupled onto lead 100. Since this shifting process is destructive, the original signals are recirculated through multiplexer 55 and returned for storage in register 56. As flip-flop 51 is clamped effectively in a reset state, a 0 level signal appears on lead 109 and that signal is compared against the information on lead 100 by "Exclusive OR" gate 54. Thus a 1 bit will be detected as a mismatch and gate 54 will transmit a signal via gate 59 and reset flip-flop 57.

Figure 7:
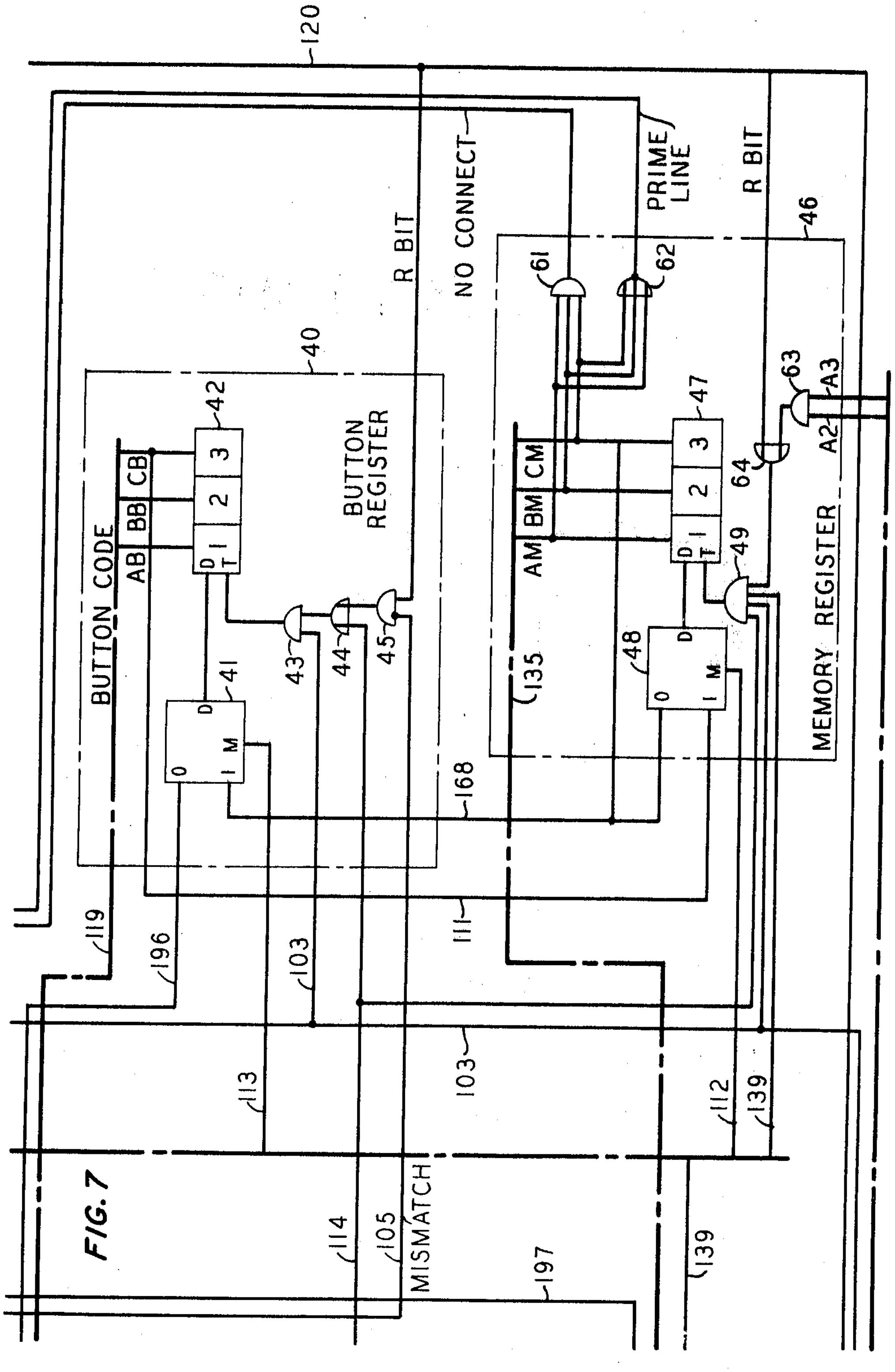
FIG. 7 shows a button code register and a memory register.

The foregoing operation is ordinarily coordinated with a separate circuit action carried on in the button register 40 shown in FIG. 7. As the bit information is shifted one at a time out of register 56, three digit binary codes are circulated in register 42 of button register 40. When a mismatch is detected, a signal appears on lead 105 which may be traced from terminal 1 of flip-flop 57, FIG. 4, to gate 45 of register 40. This signal halts the shift register operation at the last code registered in register 42 before a mismatch is detected.

Each station set button is identified by a unique binary code as follows:

| Button | Code Word |
|---|---|
| 1 | 100 |
| 2 | 000 (Prime Line) |
| 3 | 001 |
| 4 | 011 |
| 5 | 110 |
| 6 | 101 |
| EXP. (N.C.) | 111 |
| VACANT | 010 |

The code associated with button 2 is 000. It also corresponds to the state of the module circuitry during a power failure so that, as will be explained in more detail hereinafter, the prime line is automatically connected to a line module during such a failure.

Turning next to FIG. 7, it discloses two three-bit shift register arrangements which are essentially used in the determination and storage of codes relating to station set buttons. The data, or button number, may be serially shifted between button register 40 and memory register 46. Information is shifted from button register 40 to register 46 under control of multiplexer 48 and the signal level on leads 112, 113, 114 and 139. The signal levels on these leads are established by decoder 39 in accordance with a program instruction signal received on leads A0–A6. Gate 45 of Register 40 is turned on by the presence of "0" signal, a mismatch signal, on lead 105 and in succession, OR gate 44 and gate 43 is enabled. Gate 44 is enabled by the combination of "1" signal at the output of gate 45 and a "1" signal on lead 114. The latter signal is derived from the program instruction. Lead 103 connects to gate 43 and conveys clock pulses. Thus the pulsing output of gate 43 acts as a "toggle" signal and the information in register 42 is shifted bit by bit from cell 1 to 3. The output of cell 3 is coupled via lead 111 and multiplexer 48, and recorded in register 47. It is to be noted that multiplexer 48 is switched by the signal level on lead 112 so that terminal 1 is internally connected to terminal D. Concurrently, terminal T of register 47 is pulsed by the clock pulses on lead 103 via gate 49 for shifting register 47 and recording the output of register 42.

It may be appreciated that the information stored in register 47 can be circulated; i.e., output and input of register connected together, in a manner similar to the operation previously described for shift register 56 of Data Register 53. Multiplexer 48, if toggled to 0, in accordance with an instruction signal on lead 112, couples the output of the right-most cell, cell 3, of shift register 47 to the left-most cell, cell 1, of that same register. Application of toggle signals at terminal T circulates the stored information bit by bit.

While the information stored in register 47 is being circulated, it can also be recorded in register 42 of Button Register 40. If multiplexer 41 is switched by a signal on lead 113 so that internally terminal 1 and D are interconnected, the circulated pulses are conveyed via lead 168 and the Multiplexer 41 to terminal D of register 42. The concurrent application of toggle signals at terminal T shifts the circulated date and stores it bit by bit.

Figure 3:
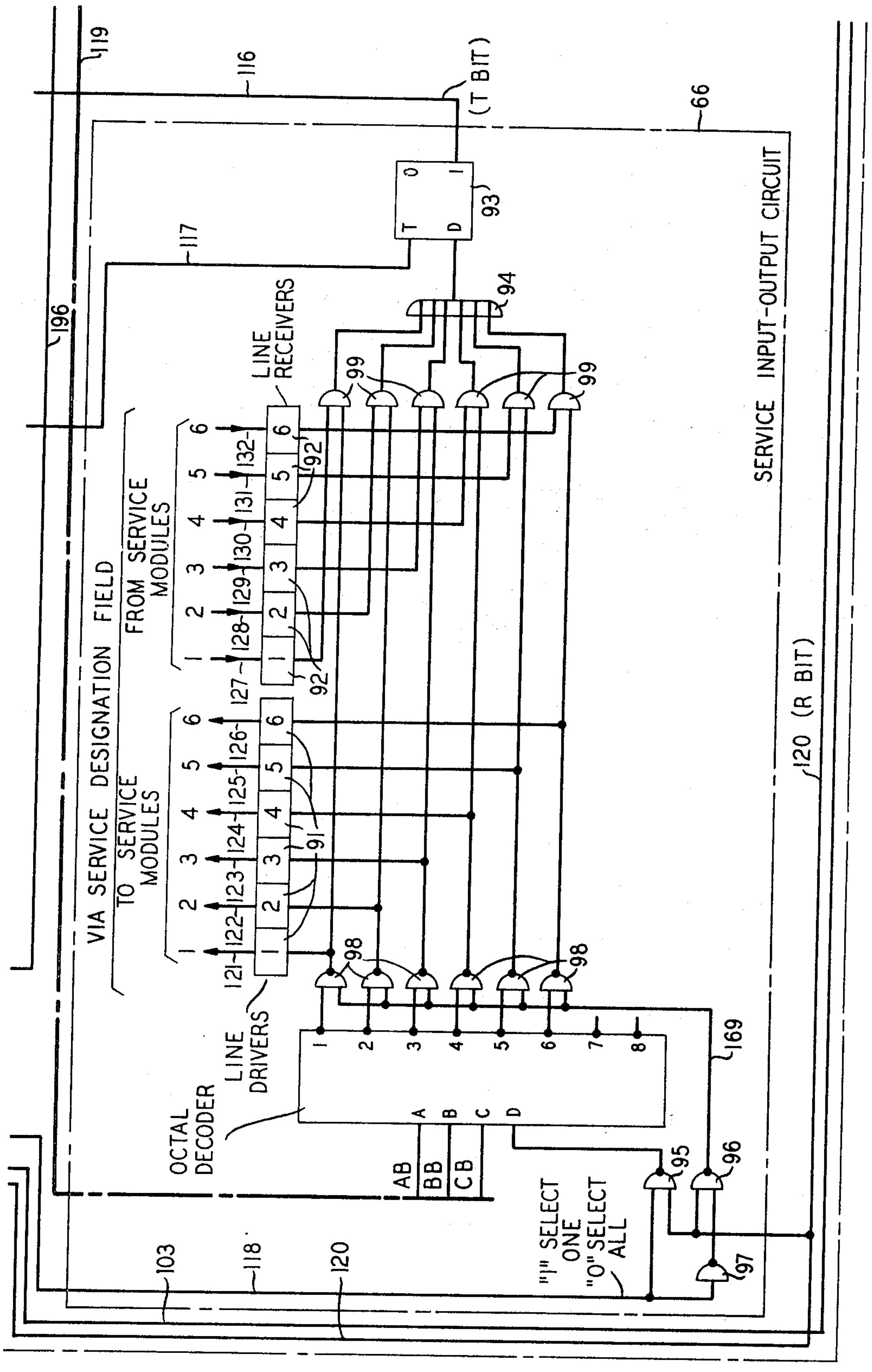
FIG. 3 shows a circuit for controlling the exchange of intermodule signals between a station module and connected service modules.

The service input-output circuit 66 shown in FIG. 3 functions to send and receive intermodule signals via leads 121–132. As mentioned previously, station set buttons 1–6 may be associated with any service designation field. A review of FIGS. 1A and 1B will assist in recalling how these cross-connections are made. Cross-connections are made between conductors 121–132 shown at the top center of FIG. 3 and service modules. For each service module associated with a particular station set button, two wires must be connected from the station module to the service module. In FIG. 3, the numbers 1–6 in line drivers 91 and line receivers 92 correspond to the button position of the station set. If, for example, it is desired to assign button 2 to a particular service, conductors 122 (outgoing data) and 128 (incoming data) are connected to the service module capable of performing the service.

The particular interconnected module with which the station module communicates via the circuit of FIG. 3 is controlled by the button code stored in Button Register 40 (FIG. 7) and also by execute signals derived by Decoder 39 from program instruction signals on leads A0–A6 (FIG. 2). Signals representative of a stored button code are forwarded via cable 119 over the leads of that cable which are designated AB, BB, and CB.

The binary code assigned to each button has been selected so that the storage of the button code corresponding to station button No. 1 in shift register 42 and the recirculating of the cell 3 binary bit will cause the generation of all button codes. Importantly, these codes will be generated in succession starting with button No. 1 and ending with button No. 6. Thus when it is necessary to transmit data to the station set, a program sequence is initiated whereby the button register 40 transmits facilely and in serial form, control signals to circuit 66 for interrogating one at a time each service module associated with each button.

In accordance with a program instruction signal, conductor 118 shown to the left-hand side of FIG. 3 conveys a "1" or "0" bit. A "1" bit controls circuit 66 so that intermodule signals are exchanged only with one service module as determined by the code stored in Button Register 40. If a "0" bit occurs on conductor 118, signals are exchanged concurrently with all cross-connected service modules. The importance of these operations will be more apparent from a consideration of programs and their functions. For purposes of the ensuing discussion, let it be assumed that the signal level on conductor 120 (R bit) does not inhibit the operation of gates 95 and 96.

If a "1" bit is assumed to be present on lead 118, the respective output of Inverter Gate 97 and NAND gate 96 is a "0" and "1." One of the NAND gates 98 connecting to terminals 1-6 of decoder 90 can therefore be enabled by a "1" signal, inverted to a "0," at any of such terminals. Decoder 90 decodes the octal signals on leads AB, BB, and CB into a one-out-of *n* code signal which is applied to one of the terminals 1–6. The enabled one of the gates 98 signals with a "1," one of the line drivers 91 and one of AND gates 99. Having enabled one of the gates 99, an intermodule signal received via the associated of the line receivers 92 is coupled to OR gate 94 and stored in flip-flop 93, "T bit" flip-flop. It should be noted that a toggle pulse on lead 117 is required to store signals in T bit flip-flop 93. This pulse is controlled through program instructions.

When it is desired to send and receive intermodule signals simultaneously over all intermodule signal channels, decoder 90 is inhibited by a "1" signal at terminal D. It will be recalled that a "0" signal is conveyed on conductor 118 to initiate this operation, and it is coupled to inhibit decoder 90 via NAND gate 95. The outputs at terminals 1–6 of decoder 90 are therefore all "0," inverted to "1"'s.

The "0" signal on lead 118 also produces a "0" signal on lead 169 via gates 97 and 96. Thus the inputs to all gates 98 from decoder 90 are "1"'s and their outputs after inversion are "1"'s. In this mode all received intermodule signals are logically combined in OR gate 94 and the output is stored in flip-flop 93.

The intermodule signalling arrangement of FIG. 4 has a more meaningful significance when it is realized that intermodule signals are exchanged at prescribed times during a program sequence. Thus the fact that such a signal exchange has occurred is significant and meaningful only if the program sequence being run at the time of the exchange is considered. An example of the utilization of intermodule signals in coordination with program instructions may demonstrate the versatility of the signalling arrangement. It may be noticed that station modules do not have memory devices for registering the various types of service modules to which they are cross-connected. When such information is required, a special program sequence is initiated and instructions are transmitted to all modules requesting that all modules of a certain type transmit intermodule signals. Station modules, upon receipt of the same instruction signal, arrange the input-output circuit of FIG. 3 to look at particular service module via line receivers 92 to ascertain the transmission of an intermodule signal in accordance with the program request. Failing to receive a signal at that time indicates that the interrogated service module is not a particular service module type. This is but one example of many examples of the use of the signalling arrangement in FIG. 3 which will be more fully appreciated from the ensuing discussion and from particular programs for operating the system.

The circuits, some of which are shown as rectangular blocks in FIG. 3, are conventional. Line drivers 91 and line receivers 92 function to isolate the cross-connect wiring of the service designation field which, in many instances, is common to other modules, from trouble conditions within the station module. These circuits, in their simplest form, may consist of diodes or, if isolation as well as amplification is required, they may consist of single stage transistor logic gates.

A switching network for selectively connecting the transmission path of the station set to the transmission path of a cross-connected line module is depicted in FIG. 5. In the system, it is preferred to separate the intermodule voice communication path from intermodule data transmission paths and accordingly additional cross-connections are required when a line module is associated with a button key of the station set. The leads which must be cross-connected are shown to the right-hand side of FIG. 5. Leads T1 and R1 correspond to button position 1, leads T2 and R2 to button position 2, etc. Note that where a particular button is associated with service modules other than line modules, cross-connections from the T- R- leads are not required.

A particular network path through switching network 201 is established under control of the button code stored in memory register 46 (FIG. 7) and execute signals on conductors 133 and 139 (FIG. 5). The latter signals are derived by Decoder 39 (FIG. 2) from particular program instruction signals on leads A0–A6. In particular, leads AM, BM, and CM of cable 135 shown in FIG. 7 connect the code stored in register 47 to respective gates 210, 211, and 212 in FIG. 5. Depending on the stored code none, one, or more of the gates 210, 211, and 212 will be enabled. For the present time, let us disregard the possibility of an inhibit signal on conductor 120 (R bit) which signal sets flip-flop 213 and, in turn, the output (term. 1) of flip-flop 213 provides inhibit signals (blocking signals) to gates 210, 211, and 212. In accordance with the code received, gates 207, 208, and 209, as well as relays 5A, 5B, and 5C are respectively enabled and operated. It may be noticed that the operation of gates 207, 208, and 209 can be inhibited by an appropriate signal on conductor 139, which signal occurs ordinarily only during the time information is being shifted into or out of register 46 in order to prevent establishment of premature or false network connections. Flip-flop 213 may be set by a signal on conductor 133 and therefore the network may be blocked in accordance with a program instruction. In addition, a signal on lead 134 can clear flip-flop 213 to remove a blocking condition under control of a program instruction.

Assuming for illustrative purposes that the code 001, corresponding to button 3, is stored in register 46, accordingly, the signal on leads AM and BM are low, while the signal on lead CM is high. Thus only gates 212 and 209 are enabled and only relay 5C operates. A network path can therefore be traced from leads TA and RA to the respective conductors T3 and R3 as follows: Beginning at lead TA, the first path includes break contact of transfer contact 5A–1, break contact 5B–4, and make contact 5C–5. The second path beginning at lead RA includes the make contact of transfer contact 5C–1, and break contacts of transfer contacts 5B–5 and 5A–2.

FIG. 6 depicts three important sub-circuits of the station module. They are Switch-hook Time Out Circuit 71, Data Transmitter 70, and Function Calculator 80. Circuit 71 stores the state of the station set switch-hook and differentiates switch-hook flashes (on-hook for less than five seconds) from permanent on-hook conditions. Circuit 71 also functions under control of program instructions to preselect the prime line (associated with button 2) prior to going off-hook or to reset network 201 (FIG. 5) to the prime line after a call is terminated and the caller has remained on-hook for at least five seconds. The switch-hook state information is conveyed via conductor 100 which couples register 56 (FIG. 4) to gates 75 and 77. Flip-flops 73 and 72 sequentially store the switch-hook information which is transferred between the flip-flops and timed in accordance with clock signals generated by the program instruction.

Circuit 71 functions to determine when the subscriber has remained on-hook for more than 5 seconds. Flip-flops 73 and 72 are respectively reset during the time the subscriber is off-hook. When an on-hook condition occurs, program originated signals sequence flip-flops 73 and 72 through various states counting the number of clock pulses on conductor 170, which pulses are separated by 5 seconds. Let us assume that the signal level on lead 120, R bit, is a one. An on-hook signal is designated by the presence of a zero level signal on conductor 100. Upon the receipt of a signal derived from program instructions on conductor 145, flip-flops 73 and 72 are set. The two successive pulses on conductor 170 thereafter toggle flip-flops 73 and 72 until their respective states are one and zero (set and reset). The following chart indicates the successive states of flip-flops 72 and 73:

| | Flip-Flop 73($Y_1$) | Flip-Flop 72($Y_2$) |
|---|---|---|
| Off hook | 0 | 0 |
| On hook (initial) | 1 | 1 |
| On hook (0–5 sec.) | 0 | 1 |
| On hook (>5 sec.) | 1 | 1 |

In particular, toggle pulses on lead 170 connect to terminal T of flip-flop 73. Flip-flop 73 toggles whenever flip-flop 72 is set. Thus, looking at the above chart, it may be appreciated that flip-flop 73 will toggle twice during the sequence in which the clock pulses on conductor 170 are counted. Flip-flop 72, however, toggles only once, since a positive going voltage appears only on its terminal T when flip-flop 73 is set — i.e., after flip-flop 73 has been toggled at least once. The outputs of flip-flops 73 and 72 are connected via cables 171 and 172 to terminals $Y_1$ and $Y_2$ of Function Calculator 80. Calculator 80 logically combines these inputs during another part of the program to ascertain how long the subscriber has been on-hook.

It is to be noted that flip-flops 73 and 72 are switched into the "0," "0" state (reset) from any other previous state when a switch-hook signal indicating off-hook is received, an update signal on cable 145 is received under program instruction, and the R bit is equal to 1. In addition, program instructions can be utilized to reset flip-flops 73 and 72 when the R bit = 1 and a restart timer pulse is sent on cable 173.

Data for controlling the lamps and the ringer of the station set is converted into bipolar signals and forwarded to a station set under control of Data Transmitter 70. One by one, each connected service module is interrogated in accordance with sequential program instruction signals sent to Service Input-Output Circuit 66. The "0" or "1" bit received from each module is temporarily stored in the T bit flip-flop 93 (FIG. 3) and sent over conductor 116, when required, to transmitter 70 for conversion and transmission to the station set. It is to be noted that the signal from circuit 66 is logically compared in Exclusive OR gate 87 with a signal from the Function Calculator 80 sent over conductor 137. The latter has the capability of altering any intermediate signal to meet various service conditions which will be discussed more fully hereinafter. An execute signal, "1" bit, which synchronizes signal transmissions is derived from the program instructions decoded by Decoder 39 and conveyed on conductor 138. This signal enables gates 88 and 89 for repeating the signal output of OR gate 87. Transformer 79 converts those signals to bipolar signals for the transmission over conductors DT and DR to the station set.

Function Calculator 80, a sum of products calculator, dynamically calculates in accordance with program instruction signals received via conductors 139–143 (terminals A, B and C of Multiplexer 81) any combinatorial logic function of the variables presented to multiplexer 81. At certain times during a program execution, calculator 80 provides temporary storage for data being manipulated. Although calculator 80 does not initiate any operational sequence, it has the ability to block various operations and thereby alter completely the response of a station module to program instruction signals on leads A0–A6 (FIG. 2). Thus in a real sense, program instructions presented to the station module are dynamically rewritten by the action of calculator 80 dependent upon its interpretation of circuit variables. Calculator 80 is a synchronous, sequential device which sacrifices speed of operation for circuit simplicity. It operates essentially under program control and is capable of performing a variety of logic operations — such as an AND function, an OR function, an NAND function, and so forth.

Multiplexer 81 is, in effect, a variable selector with *n* inputs on which input variable signals appear and any one of which may be connected to the terminal labelled D in accordance with the code received on terminals A, B, and C. The output of multiplexer 81 is complemented by the Exclusive OR Gate 82 if the signal on lead 142 is "1" and not complemented if the signal is "0." The AND function calculator comprising gate 83 and flip-flop 84 forms the product of (complemented/non-complemented) sequentially received input variables and stores the answer as the state of flip-flop 84. The OR function calculator comprising gate 85 and flip-flop 86 sequentially forms the sum of products at the output of the AND function calculator. Thus it may be seen calculator 80 can sequentially form any combinatorial logic function of the input variables presented to the variable selector, multiplexer 81. For additional details as to the working of logic function calculators in general, reference may be made to U.S. Pat. No. 3,246,303 to L. D. Amdahl et al. of Apr. 12, 1966.

An example of the operation of calculator 80 in solving the problem: $F = Y_1Y_2\overline{T} + \overline{Y}_1\overline{Y}_2T$ is now presented. Restating the problem, it is desired to determine the answer, F, to a problem consisting of the sum of two products of three variables (complemented and uncomplemented). The function F may be solved by inputting the problem variables, one at a time, beginning at the left-hand side. An equal sign requires one to preset flip-flop 84 and to clear flip-flop 86. Flip-flop 84 may be preset by a 0 level signal on conductor 144. Flip-flop 86 may be reset by a 0 level signal on conductor 174. In reading the variables from left to right, when a plus sign (+) is encountered, the state of flip-flop 84 is forwarded to flip-flop 86 and flip-flop 84 is preset once again.

Assuming we have initialized flip-flops 84 and 86 in accordance with the equal sign, assume that program signals appear on conductors 139-141 for selecting terminal 3, $Y_1$, which is connected via terminal D to Exclusive OR gate 82. Since the problem does not require $Y_1$ to be complemented, program control generates a 0 level signal on conductor 142. The output of gate 82 is combined with the output of flip-flop 84 in AND gate 83; and upon receipt of a toggle signal on lead 143, it is stored in flip-flop 84. The state of flip-flop 84 now conforms to the $Y_1$ signal. In sequence, $Y_2$ and the complement of T are coupled to flip-flop 84 each time the product of two variables is formed, i.e., $Y_1$ with $Y_2$ and the product of $Y_1Y_2$ with $\overline{T}$. Following the instruction required for a plus sign, the program control generates a toggle signal on cable 175, causing the state of flip-flop 84 logically combined in OR gate 85 and stored in flip-flop 86. Flip-flop 84 is also preset. Subsequently, multiplexer 81 under control of program signals selects, in order, terminal 3, terminal 4, and terminal 0 forming the product of the variables $\overline{Y_1Y_2}$ and T. Complements of the variables $Y_1$ and $Y_2$ are achieved by combining the output of multiplexer 81 with a one signal on cable 142 in Exclusive OR gate 82. To arrive at the answer, F, the state of flip-flop 84 is summed with the previous product of variables $Y_1Y_2$ and $\overline{T}$ stored in flip-flop 86. Upon receipt of a toggle signal on cable 175, the output of flip-flop 86 is logically combined in OR gate 85 with the output of flip-flop 84 and stored in flip-flop 86. The resultant answer, F, is the state of flip-flop 86 and is referred to hereinafter as the R bit.

Figure 8:
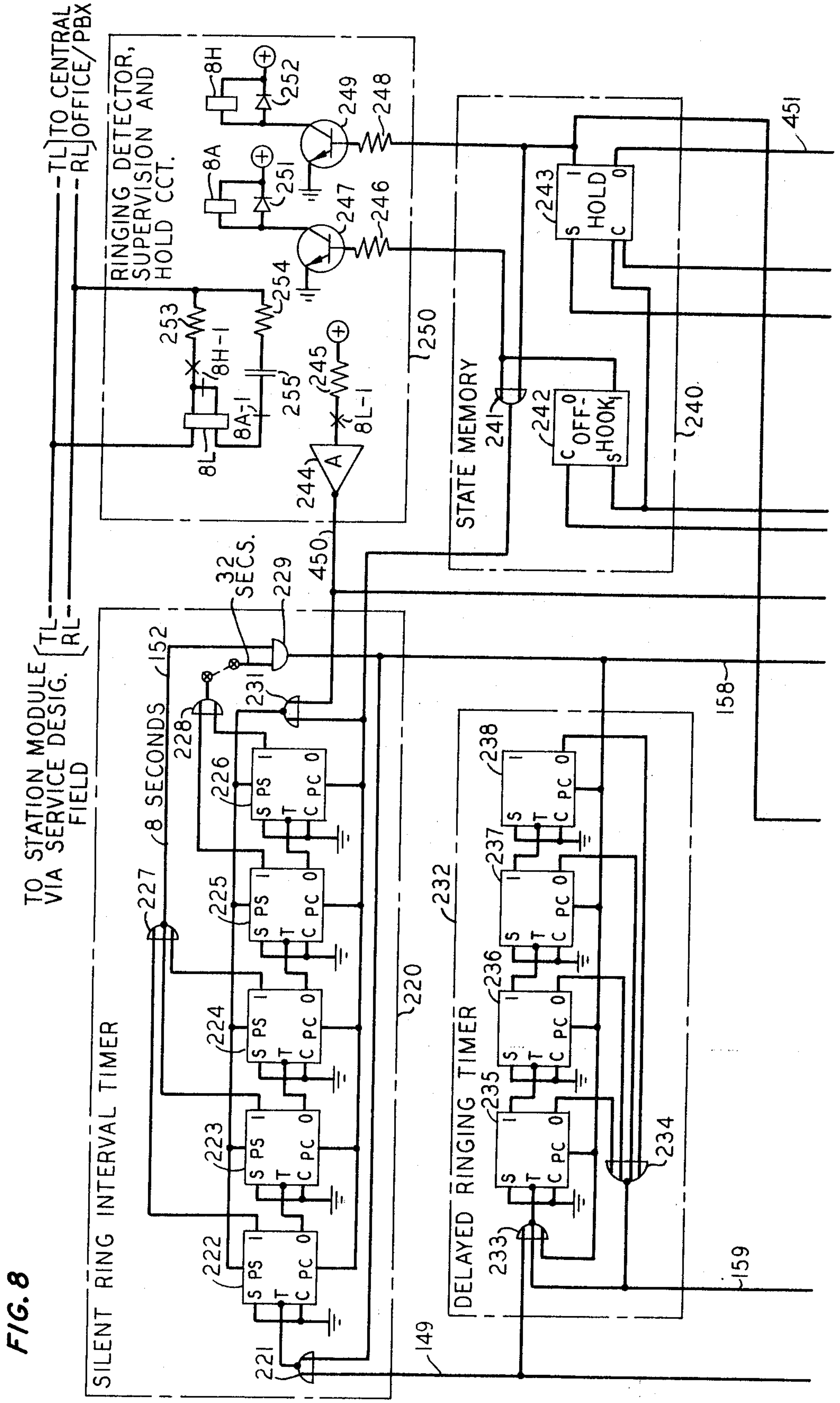
FIGS. 8 and 9 show the circuitry of line module.
Figure 9:
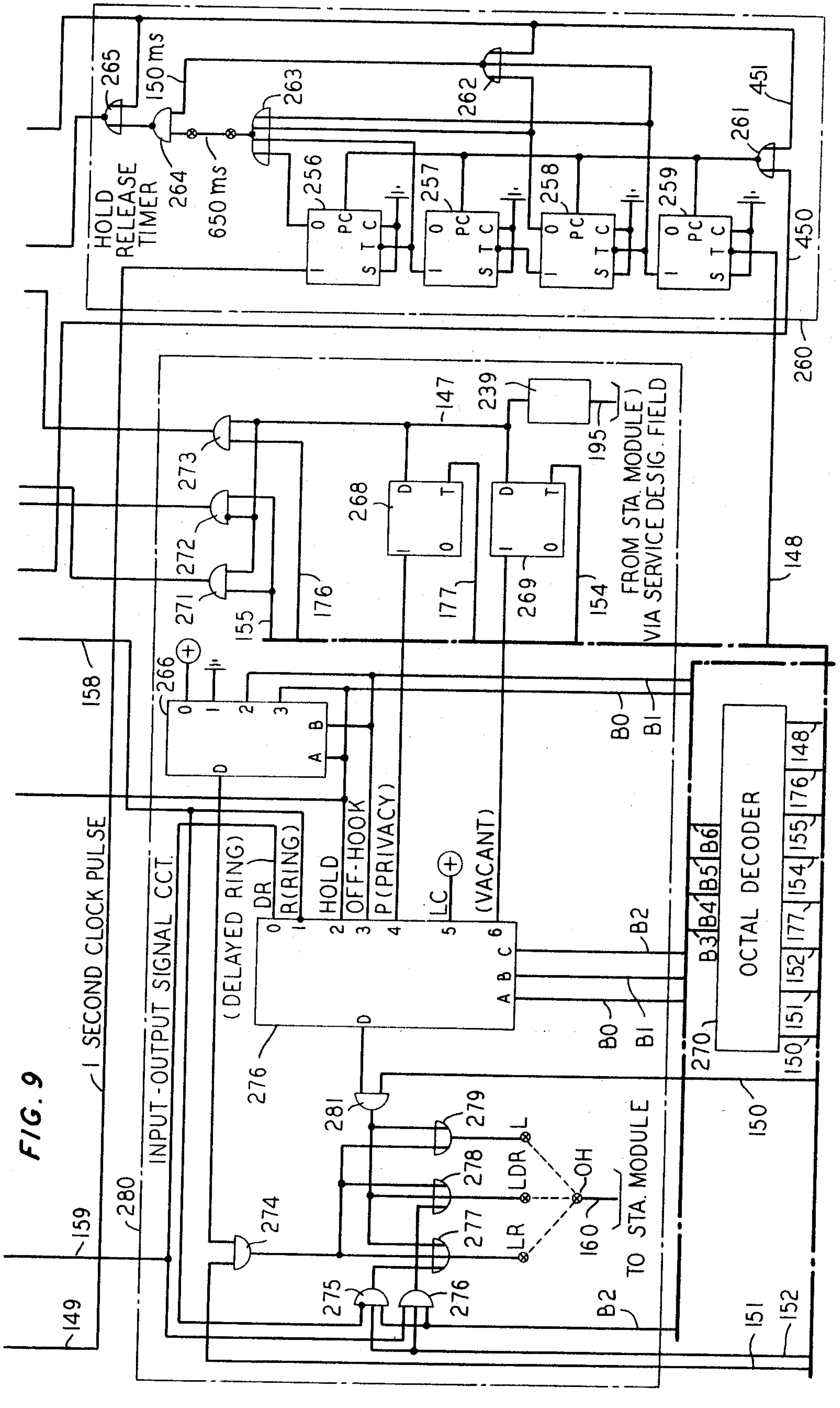
Figures 10, 12, 13, 14:
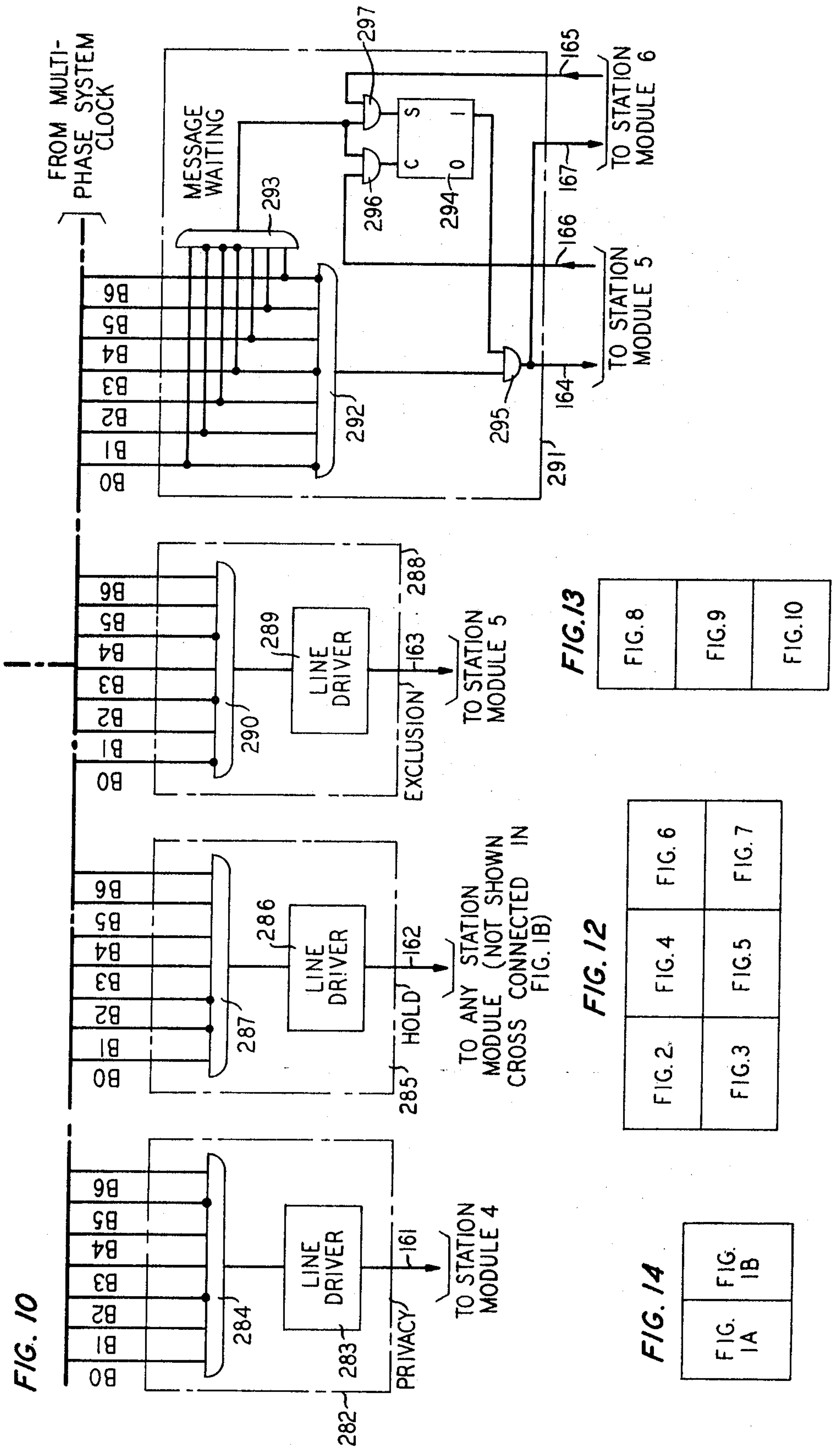

LINE MODULE (FIGS. 8 and 9)

This module provides an interface between a central office or PBX line and cross-connected station modules. It is controlled in accordance with program signals forwarded by the multiphase system clock over conductors B0-B6 shown in FIG. 9. The line module can:

1. detect a ringing signal on leads TL and RL (FIG. 8) and send ringing and lamp information to all cross-connected station modules. A feature is the provision of a delayed ringing signal sixteen seconds after the detection of ringing on leads TL and RL;
2. hold incoming calls and transmit a winking lamp signal to all cross-connected station modules as an indication of the hold condition;
3. detect off-hook conditions on leads TL and RL when a station set connected via the switching network of a station module is connected to the line module and transmit a steady lamp signal to all cross-connected station modules as an indication of an off-hook condition;

4. detect on-hook conditions occurring on "held" calls, and in such an event, restore the line module to an idle state after 150 milliseconds (650 ms. with option);
5. time the silent intervals between successive ringing bursts (8 seconds or 32 seconds, depending upon a wired option); and
6. provide privacy which may be activated by any station set cross-connected to the line circuit for preventing all other station sets having an appearance of the line circuit from intruding on an established connection.

The line module contains some conventional key telephone circuitry principally in the sub-circuit entitled Ringing Detector, Supervision and Hold Circuit 250. Some of the details of this circuitry may be found by reference to U.S. Pat. No. 3,239,610 to C. E. Morse et al. of Mar. 8, 1966. A major portion of the line module circuitry is concerned with various timing operations. Silent Ring Interval Timer 220, as the name implies, times the silent period between consecutive ringing signals to ascertain an on-hook condition occurring during the ringing interval. Delayed Ringing Timer 232 times for a predetermined interval after detection of the initial ringing signal. The output of timer 232 is conveyed to all associated station modules at a time prescribed by program instructions to cause ringing or lamp signals at stations associated with cross-connected station modules. Hold Release Timer 260 times a fixed interval after a PBX or central office on-hook condition has been detected during a hold condition.

Timer 220, timer 260, and timer 232 are similar in various respects principally because they comprise cascaded stages of flip-flop circuits, counter circuits, which may be triggered sequentially in response to the receipt of a clocking pulse. The clock signals for timer 260 are derived from program instructions decoded by decoder 270 and conveyed on lead 148 to terminal T of flip-flop 259. The output of the last stage, flip-flop 256, is connected via conductor 149 to output gates 221 and 233 of respective timers 220 and 232. Ordinarily, the counter circuit of timer 260 is free-running so long as the clock pulses appear on conductor 148, producing a one second pulse on lead 149.

The ringing detector consists of relay 8L, capacitor 255, and resistor 254 shown in Ringing Detector, Supervision and Hold Circuit 250 (FIG. 8). Upon receipt of a ringing burst on leads TL and RL, relay 8L operates over an operating path which includes in series connection the upper and lower windings of relay 8L, break contact 8A–1, capacitor 255, and resistor 254. During the idle condition, a one level signal appears on conductor 158 which it may be seen connects to terminal PC of flip-flops 235–238 of Delayed Ringing Timer 232. Thus these flip-flops are held in the clear state. Upon detection of ringing, flip-flops 222–226 are preset in the set state. The counter arrangement of timer 220 counts down — i.e., initially all flip-flops are set; and as pulses are counted, succeeding states are reset. The path for initializing flip-flops 222-226 may be traced from battery in circuit 250, resistor 245, make contact 8L–1, amplifier and inverter 244, and gate 231. Setting flip-flops 222–226 changes the level on conductor 158 from "1" to "0" for allowing delayed ringing timer 232 to begin to count a 16 second interval. In particular, when flip-flops 222-226 are set, their respective outputs, connected to OR gate 227 and to OR gate 228, generate a "0" signal on conductor 158. When the ringing burst ceases, relay 8L releases and the set pulse is removed from flip-flops 222–226. Since the flip-flops 222-226 are no longer jammed in the set state, pulses appearing on conductor 149 via OR gate 221 toggle flip-flop 222. In succession, and at half the frequency, succeeding flip-flop stages are toggled. Flip-flop 226 is toggled every 16 seconds. When the next ringing burst appears, relay 8L reoperates and sets flip-flops 222–226 and thereby cancels any count made since the last ringing burst. If successive ringing bursts do not occur within eight seconds, the output of OR gate 227 is changed from a 0 to a 1 state. If it is desired to time for thirty-two seconds, gate 228 is connected to gate 229 and gate 229 produces a "0" output only after gates 227 and 228 develop "1" at their respective outputs. If timer 220 times out, conductor 158 is made high, clearing flip-flops 235–238 of Delay Ringing Timer 232.

Timer 232, as previously mentioned, is maintained in a clear, or reset state, normally until the first ringing burst is detected. When the "set jam" signal on conductor 158 is removed, the clock signals on conductor 149 are connected via OR gate 233 to toggle flip-flop 235. The counter arrangement of timer 232 counts up — i.e., all flip-flops are initially reset and are set as each pulse is counted. If a jam set pulse does not appear on conductor 158 within 8 seconds, flip-flops 235-238 are all set producing at the output of OR gate 234 a "1" signal on lead 159.

A hold condition is established in response to an intermodule signal received concurrently with a program instruction. In FIG. 9, AND gate 273 is responsive to a "1" signal on conductors 147 and 176 to produce a set signal to set flip-flop 243, thereby operating relay 8H over an obvious path. In operating relay 8H at its transfer, contact 8H–1 connects one winding of relay 8L to leads TL and RL to monitor the line supervisory signals.

Hold Release Timer 260 times interruptions in the supervisory signals received on leads TL and RL during a hold condition. If there is no supervisory signal for at least 150 ms., (650 ms. if a wired option is provided), then the hold condition is released and the line module is restored to the idle state. In the hold condition and while an off-hook signal is maintained on leads TL and RL flip-flops 256–259 are jammed in their reset position. When the supervisory signal is interrupted, relay 8L releases and the signal on conductor 450, shown at the lower right-hand corner of FIG. 9, is changed from a "0" to a "1." As a result, the jam reset signal on flip-flops 256–259 is removed. Accordingly, clock pulses on conductor 148 toggle flip-flop 259 and the count begins. If the on-hook condition is only temporary, relay 8L reoperates and conductor 450 is restored to 0 state resulting in a jam reset signal which is applied to flip-flops 256–259. Gate 262 of timer 260 produces an output after 150 ms. which clears the hold flip-flop 243 when flip-flop 258 is set and flip-flop 259 is reset. If the wired option for 650 ms. is provided, the hold flip-flop 243 is not cleared until flip-flop 257 is set and flip-flop 256 is reset.

Turning next to State Memory 240, it contains memory devices, flip-flop 242 and 243, for recording the off-hook and hold conditions of the line module. The states of these memory devices are set or reset in response both to program instruction signals decoded by decoder 270 and signals from cross-connected station modules. The states of Memory 240 can be forwarded during a program sequence to a station module where they are computed and returned to set, or reset, the memory devices of Memory 240.

In the lower left-hand corner of FIG. 9 there is disclosed octal decoder 270 which performs substantially the same function as decoder 39 (FIG. 2) discussed previously. It functions to convert program instruction signals received on leads B0–B6 in a predetermined manner into execute and control signals on various leads. Specific details as to the particular ones of those leads which are activated in response to program instructions are disclosed in the section headed "System Programs."

Input-output signal circuit 280 is controlled in accordance with program instruction signals to store and to forward intermodule signals conveyed between the line module and interconnected station modules. Incoming signals appear on conductor 195 which, it will be recalled, is cross-connected to each particular station module. Memory buffer 239 furnishes temporary storage as well as isolation to protect the integrity of the signal channel. Outgoing signals from the line module are conveyed over conductor 160 which is also cross-connected to each station module associated with the line module. It is to be noted that there are shown three alternative wiring plans for the outgoing data lead. Terminal OH is cross-connected to terminal L if lamp signals only are desired, cross-connected to LR if lamp and ringing signals only are required, and to terminal LDR if lamp signals and delayed ringing are preferred. Multiplexer 267 and multiplexer 266 are controlled by instruction signals at various times during the program to couple particular ones of the line module state signals to outgoing signalling conductor 160. Flip-flops 268 and 269 are additional temporary memory for incoming signals on conductor 147.

The privacy feature of the line module is actuated in response both to an intermodule signal and a program instruction signal on conductor 177. When a station requests privacy, the station module associated with the originator's station set transmits an intermodule signal which is received via conductor 147 and stored in flip-flop 268. Thereafter, during a different portion of the program, multiplexer 267 is controlled by program instruction signals to couple the stored privacy signal via AND gate 281 and one of the cross-connected gates 277–279 to all cross-connected station modules. The particular station module associated with the station set having made the request ignores the signal while all other station modules interpret the signal as a block, or inhibit, signal preventing network connections to the line module.

PRIVACY, HOLD, EXCLUSION (FIG. 10)

These three service modules although related to different features are considered together because their internal circuitry is substantially identical and they function in substantially the same manner. Each module comprises an AND gate connected to instruction signal conductors conveying program signals from the multi-phase system clock. Each, it will be noted, however, have different coded inputs so that their respective AND gates 284, 287, and 290 operate on different coded signals. Thus, each time a code corresponding to one of these features appears on conductors B0–B6, s signal is sent via respective line drivers 283, 286, and 289 over output data leads 161, 162, and 163. These leads are cross-connected to all of the station modules with the particular service so that they receive these signals at prescribed times during the program. A more meaningful understanding of these feature modules can be obtained from a consideration of specific program operations.

MESSAGE WAITING (FIG. 10)

Message Waiting Module 291 operates in two modes in accordance with two separate and distinct program instruction signals. In the one case, AND gate 292 is turned on and if flip-flop 294 is set, a signal is transmitted via conductor 164. A different code operates AND gate 293 for setting flip-flop 294, if an intermodule incoming signal is present on conductor 165.

In actual operation, conductors 164 and 166 are cross-connected to a station module associated with one particular set. Conductors 165 and 167 are cross-connected to a second set where the station subscriber has the ability to answer calls for the first set and desires the additional ability to leave a signal indication of such calls when unanswered by the first set. The station module associated with the second set generates a signal which is coupled over conductor 165 and sets flip-flop 294 at a particular interval during the program determined by the operation of gate 293. Thereafter, the output of flip-flop 294 (term. 1) is conveyed via gate 295 during a different interval of the program, as determined by the operation of gate 292 to the station module associated with the first station set over conductors 164. The latter station set, in turn, controls a lamp indication at the first station set. When the subscriber of the first station set wishes to extinguish the indicating lamp, he transmits a signal by depression of a key, for example, and the associated station module forwards a signal via conductor 166 which clears flip-flop 294 during a particular interval of the program as determined by the operation of gate 293.

SYSTEM PROGRAM

All modules connect to multi-phase system clock 7 wherein clock signals are generated for directing circuit operations. In the illustrative example, the output of clock 7 is divided between an A bus which connects to all station modules and a B bus which connects to all other modules. The A and B bus can be arranged to convey identical instruction signals or only so much of the program as pertains to the modules served. In the present example, both the A and B bus convey concurrently identical clock, or instruction, signals.

A specific sequence of system clock signals, or words, is required to perform any operation. A word as used herein refers to a binary pattern of signals transmitted simultaneously on the system clock leads; and operations are programmed by specifying a sequence of system clock words. Each word is composed of seven bits, or signals, designated for convenience as bits A0–A6, if sent over the A bus, and as bits B0–B6, if sent over the B bus. Hereafter reference is made to bits A0–A6, only, but it will be understood that the following description pertains as well to bits B0–B6.

Within each word there is a sub-structure identifying the mode, the operating function, and an execute signal. Bits A0 and A1 specify the operating mode of which there are four possible states.

| Bits | | |
|---|---|---|
| A0 | A1 | Operation Mode or Function |
| 0 | 0 | Initialize/Update |
| 0 | 1 | Register Shift Mode |
| 1 | 0 | Calculate Function |
| 1 | 1 | Station Set Transmission |

Bits A2–A5, referred to herein as control bits, specify and control the particular operation performed in all modes except Mode "11." Bit A6 in three of the modes serves as the execute bit. The execute bit of a single word is insufficient in certain modes to convey the execute signal required for a particular instruction. For example, in Mode "00," the Initialize/Update mode, each instruction after being converted to its binary equivalent must be transmitted two times, the only difference in each transmission being the bit position A6. Operations in Mode "00" are initiated by level changes and thus two words must be consecutively generated to execute the instruction. This is obtained by sending a zero in the bit position A6 in the first binary word followed by a one in the second binary.

"00" MODE (INITIALIZE/UPDATE)

This mode contains the initializing and updating instructions for various module circuit components. In addition, it contains instructions which pertain to the function calculator mode which are included herein because of code shortages in the function calculator mode. This mode also contains switch-hook timing and updating instructions. Many of the instructions in this mode are what is termed "conditional instructions" in that they are internal state dependent instructions. Such instructions are not executed unless some circuit condition is met. Uniformally throughout these instructions the condition is the R bit = 1. Ordinarily, the conditional instruction follows a series of Mode "10," Function Calculator, instructions.

In Mode "00," shift registers and data transfer circuitry of the station modules are inhibited. The respective level of conductors A0 and A1 in this mode are 0 and this condition is decoded by the modules to generate jam set signals.

The following is a list of program instructions which may be performed in this mode. Along with each instruction there is the binary format for leads A0–A6 and a brief summary of the operation and circuitry activated in accordance with the instruction signal. In addition, there is included in the summary, the identity of conductors which carry the enabling signals.

IF R = 1; SEND:ALL (0,0,0,0,0,0)

In FIG. 3 of the station module, circuit 66 is activated to signal all connected service modules when conductor 120 is "1" (R bit) and conductor 118 is "0."

IF R = 1; UPDATE S. H. BIT (0,0,1,0,0,0)

In FIG. 6 of the station module, circuit 71 is controlled by the signal level on conductor 145 to take the switch-hook data stored in cell 7 of register 56 and store it in flip-flop 73. The execution of the instruction is dependent on the level of the R bit. If R = 1, the instruction is executed; otherwise, circuit 71 is unaffected.

IF R = 1; RESTART TIMER (0,0,0,1,0,0)

This instruction cycles flip-flops 72 and 73 of circuit 71 (FIG. 6), respectively, to state "1" if R bit = 1 by application of a step pulse on conductor 173.

UPDATE S. H. TIMER (0,0,1,1,0,0)

This instruction is to be inserted into the program so that the instruction appears at 5 second intervals. In FIG. 6, it controls the generation of a toggle pulse on conductor 170 for setting and resetting flip-flops 72 and 73.

RD =0; (0,0,0,0,1,0)

This instruction clears flip-flop 51 shown in FIG. 4 and is used preliminary to searching for a "1" bit (button depression) in register 56.

R = R + X; (0,0,1,0,1,0)

This instruction is one of the function calculate mode instructions for convenience placed in this mode. With reference to FIG. 6, it logically sums the data stored flip-flop 86 (R bit) with that stored in flip-flop 84 (X bit). The instruction is executed upon receipt of a toggle pulse on conductor 175.

X = 1; (0,0,0,1,1,0)

This instruction sets flip-flop 84 (FIG. 6) (X bit) of calculator 80 with a set pulse on conductor 144.

R =0, (0,0,1,1,1,0)

This instruction clears flip-flop 86 (FIG. 6) (R bit) of calculator 80 with a reset pulse on conductor 174.

MISM = 0, (0,0,0,0,0,1)

This instruction clears flip-flop 57 (FIG. 4), mismatch signal store, of Data Register 53 with reset pulse on conductor 197.

MISM = 1, (0,0,1,0,0,1)

Flip-flop 57 (FIG. 4), mismatch signal store, of Data Register 53 is set with a pulse on conductor 198.

IF R = 1; READ:ALL (0,0,1,1,0,1)

With this instruction all interconnected modules are read by circuit 66 (FIG. 3) and their signals are logically combined in OR gate 94 (FIG. 3) and stored in T bit flip-flop 93. If R = 1, the level on conductor 120 and the program instruction signal level on conductor 110 enable all line receive AND gates 99. Concurrently, a toggle signal is sent over conductor 117 so that the logical output of gate 94 is stored in flip-flop 93.

IF R = 1; READ:ONE (0,0,0,0,1,1)

This instruction is similar to the one immediately above except that a "0" level signal occurs on conductor 118 allowing one interconnected module to be read in accordance with a button code stored in button register 40 (FIG. 7), and its output to be stored in T bit flip-flop 93.

IF R = 1; SEND:ONE (0,0,1,0,1,1)

In FIG. 3, circuit 66 is activated to send a sign to one of the interconnected service modules in accordance with the button code stored in button register 40. In particular, conductor 118 conveys a "0" level signal and conductor 120, a "1" level signal to initiate the action.

IF R = 1; NI = 1 (0,0,0,1,1,1)

The network blocking flip-flop 213 shown in FIG. 5 is set with a set pulse on conductor 133 if concurrently the signal level on conductor 120 is a "1."

IF R = 1, NI = 0 (0,0,1,1,1,1)

The network blocking flip-flop 213 shown in FIG. 5 is cleared with a reset pulse on conductor 134 if concurrently the signal level on conductor 120 is "1."

It is to be noted that the binary code, 0,0,1,0,1,1 is unused.

"10" MODE (FUNCTION CALCULATE)

This mode contains various instructions each having a similar format for using Function Calculator 80 shown in FIG. 6. It will be recalled that the function calculator may be used to form the product of variables, or their complements, and to add products of variables to each other. All the instructions to operate Function Calculator 80 are not contained in this mode. Due to a shortage of codes, instructions in this mode are limited to forming the product of variables or their complements. Products are added together utilizing an instruction from the "00" mode, namely, R = R + X.

In this mode, the signals on conductors A0 and A1, respectively "1" and "0," inhibit the transmission of execute signals on all conductors in the station modules except conductor 143 which controls the toggling of the X bit flip-flop 84.

All instructions in this mode have the same basic format and are written as shown below. Two consecutive binary encoded words are necessary for each instruction. This is required so that a toggle pulse may be generated using the A6 bit position of the word. Unlike the "00" mode, operations in this mode are executed on pulse transitions rather than step functions, thus writing two consecutive words wherein A6 is "0" followed with the same instruction word except A6 is a "1" generates the necessary pulse transition.

$X = X \cdot (\text{Variable}/\overline{\text{Variable}})$ (1,0,A2,A3,A4,A5,———) The variable which is to be multipled by X is indicated in accordance with a binary code transmitted in bit positions A2, A3, and A4. If a complement of the variable is to be formed in the function to be solved, this is indicated in bit position A5. The following chart indicates the binary code for bits A2, A3, and A4 for the different variables.

| BITS | | | |
|---|---|---|---|
| A2 | A3 | A4 | Variable |
| 0 | 0 | 0 | T |
| 1 | 0 | 0 | NC |
| 0 | 1 | 0 | PL |
| 1 | 1 | 0 | Y1 |
| 0 | 0 | 1 | Y2 |
| 1 | 0 | 1 | MISM |
| 0 | 1 | 1 | RD |
| 1 | 1 | 1 | NI |

To form the complement of the variables indicated by the binary code written in bit positions A2–A4, Bit A5 = 1.

With reference to FIG. 6, the data in bit positions A2–A4 are connected respectively to conductors 139–141 which connect to terminals A, B and C of multiplexer 81. Reference may be made to FIG. 11 wherein terminal activated for each octal code received at terminals A, B, and C are enumerated. The information on bit position A5 connects via conductor 142 to exclusive OR gate 82 for therein forming the complement of the variable selected by multiplexer 81. This same instruction controls the transmission of a toggle signal on conductor 143 and the product of the selected variable and the previous state of the X bit flip-flop 84 is stored in the latter flip-flop.

"01" MODE (REGISTER SHIFT)

This mode consists of numerous instructions for circulating and shifting data between Button Register 40, Memory Register 46, and Data Register 53. Some of the shifting instructions are conditional. The condition may be R = 1 and Mismatch = 0, or R = 1, alone. Unless these conditions are met in the internal circuit at the time the instruction is received by the module, the instruction is not executed.

Instructions in this mode are similar to those instructions of the "00" mode in that two consecutive binary encoded words must be written for each instruction. This obtains because operations are executed on receipt of a step function as opposed to pulse transitions; thus the program must generate a 0–1 in consecutive words in the A6 bit position.

The following conventions are observed in writing program instructions in this mode:

CD = Clock Data
BR = Button Register
DR = Data Register
MR = Memory Register
→ = Is shifted into In this mode, decoders 37 and 38 of System Clock Decoder 39 are inhibited by the signal levels 0 and 1 on respective leads A0 and A1. This prevents the operation of all system circuits except register circuits 40, 46, and 53.

The following are a list of instructions for this mode. Under each instruction is given a brief summary of the circuit operations, and there are indicated the leads which are activated upon the receipt of the particular instruction signal.

IF R = 1 AND MISM = 0; CD → BR (0,1,0,0,0,A5,A6)

In this instruction, data presented in the A5 bit position is shifted into register 42 of Button Register 40. The shift is, however, conditioned upon a "1" level signal on conductor 120 and a "0" level signal on conductor 105. Also, conductor 113 is "0" for connecting terminal 0 with terminal D of multiplexer 41. Each instruction will shift register 42 once and accept a "0" or "1" in the A5 bit position in cell 1. A toggle pulse for shift register 42 is conveyed on conductor 103 and derived from the signals on lead A6.

DR → DR; IF R = 1 AND MISM = 0 CD → BR

This is a compound instruction which calls for circulation of data in the data register and concurrently therewith shifting of data recorded in bit position A5 into register 42 of Button Register 40. It is to be noted that the shifting of data from bit position A5 into Button Register 40 occurs only if two conditions are met; i.e., conductor 120 conveys a "1" level on conductor 105 and a "0" level. This is the instruction used to locate a "1" bit in the Data Register 53.

This instruction format causes conductor 113 to carry a "0" level signal for connecting clock data on conductor 196 to terminal D of register 42. In addition, execute signals on position A6 are coupled via conductor 103 to T terminal of register 42. In Data Register 53, cable 101 carries a "1" level and thereby terminals 1 and D of multiplexer 55 are interconnected.

CD → BR (0,1,0,1,0,A5,A6)

This instruction is substantially the same as the first instruction enumerated above in this mode with the exception that the conditionals are removed.

DR → DR; CD → BR (0,1,0,1,1,A5,A6)

This instruction is substantially the same as the second instruction mentioned above in this mode with the exception that the conditionals are removed.

MR → BR; IF R = 1 THEN MR → MR (0,1,1,0,1,0,A6)

This instruction causes the data stored in shift register 47 of Memory Register 46 to be circulated if conductor 120 has a "1" level signal thereon. Also, this instruction transfers data stored in Memory Register 46 into register 42 of Button Register 40. During this instruction, a "0" level is forwarded on conductor 112 for connecting terminals 0 and D of multiplexer 48. Also, a "1" level is forwarded on conductor 139 to enable a toggle pulse on conductor 103 to shift register 47. In addition, a "1" level is conveyed on conductor 113 for connecting terminal 1 to terminal D of multiplexer 41. The latter connection couples the circulating path of Memory Register 46 with the input terminal of register 42.

MR → MR; MR → BR (0,1,1,0,0,0,A6)

This instruction is substantially the same as the preceding instruction with the exception that the conditional, R = 1, is omitted.

BR → MR; IF R = 1 THEN MR → BR (0,1,1,1,1,0,A6)

In this instruction, the information stored in Button Register 40 is exchanged with the information stored in Memory Register 46. To direct this operation, a "1" level signal is conveyed on conductors 112, 113 and 139. These signals connect terminal 1 to terminal D of multiplexers 41 and 48. In this configuration, both registers are toggled simultaneously, and their outputs are exchanged. The transfer from the memory register to the button register is, however, conditioned on a "1" level on conductor 120.

MR → BR; BR → MR (0,1,1,1,0,0,A6)

This instruction is substantially the same as the preceding instruction with the exception that the conditional R1 is omitted.

"11" MODE (SEND AND RECEIVE)

During this mode, data is transmitted to a station set and simultaneously received from the same set. The return signal from the station set is a consequence of the transmitted signal, since the station set apparatus contains essentially passive circuitry. Uniquely, each word in this mode controls a plurality of circuit operations instead of the usual single operation described hereinbefore for other modes.

In this mode, the respective one signals on leads A0 and A1 preset a number of station module circuits. With reference to FIG. 6, a "1" level is transmitted on conductors 139–141 for setting multiplexer 81 at the T bit variable position. In addition, conductor 142 conveys a "0" signal so that the T bit variable is not complemented. Thus, in this mode, the X bit of the function calculator equals the T bit and the calculator is used as a simple memory device. Also, in this mode, referring to FIG. 4, conductor 101 conveys a "0" level signal; and accordingly, multiplexer 58 connects the clock signals derived from the incoming signals to the shift register 56. This configuration synchronizes the incoming signal and the shift register 56 operation. Conductor 114 conveys a "1" signal to Button Register 40 (FIG. 7) for making the register shift unconditionally with respect to the R bit. Another initial condition set by the mode is the "0" level on conductor 113 (FIG. 7) which connects terminals O and D of multiplexer 41 so that clock data in the instruction word may be coupled directly into Button Register 42.

The following list of instructions may be simultaneously performed as a result of a single word instruction in this mode. Each bit position A2–A6 individually controls each of the program instructions as follows:

| Instruction | Bit |
|---|---|
| 1. X=X·T | A2 |
| 2. Read:all/one | A2,A4 |
| 3. Transmit | A3 |
| 4. X=1 | A6 |
| 5. CD BR | A6,A5 |

The instructions numbered 1, 2, and 5 function on transitions while the instructions numbered 3 and 4 are activated on level changes or step functions. Thus, each instruction in the "11" mode must be preceded by "0"'s in bit positions A2–A6 to assure transitions and level changes.

A2 BIT

In the "11" mode, if the A2 bit is "1," effectively two instructions are generated and they are $X = X \cdot T$ and READ:ALL/ONE. The A4 bit in the work determined whether the READ instruction is ALL or ONE. A "1" as the A4 bit indicates ONE and a "0" in the bit position indicates ALL.

It will be recalled that calculator 80 is jammed into a specific circuit configuration during this mode so that the product of the T variable is formed with the initial state of the X bit, flip-flop 84, on the receipt of a toggle pulse on conductor 143. This pulse is generated if the A2 bit = 1. Concurrently, the data in T bit flip-flop 93 (FIG. 3) is updated so that the intermodule signal from ALL/ONE of the interconnected service modules is read. This latter action is initiated by the presence of a toggle voltage on conductor 117.

A3 BIT

A "1" level in this bit position directs the transmission of the information stored in the T bit flip-flop 93 to the station set. This instruction is designated TRANSMIT. In particular, a "1" signal on conductor 138 (FIG. 6) enables data transmitter 70. It is to be noted that the X bit equals the T bit and, therefore, no change in the T bit signal occurs as a result of logically combining the T bit and X bit signals in exclusive OR gate 87.

Referring to FIG. 4, for each pulse transmitted, a pulse is received via data receiver 53 from the station set. The received information is stored in shift register 56 of data register 53.

A4 BIT

The presence of a "0" or "1" in this bit position determines whether ALL or ONE of the interconnected service modules transmit signals to the station module. For additional details refer to the discussion above under the heading "A2 Bit."

A5 BIT

If it is desired to record data in Button Register 40 (FIG. 7) at the same time that signals are transmitted to and received from the station set, the data is recorded in this bit position. It will be recalled that the mode signals establish a connection between conductor 196 and shift register 42 for conveying directly into that register the binary information in this bit position.

A6 BIT

The signal in this bit position controls two distinct operations which are: X = 1 and CD → BR. The first instruction presets the X bit, flip-flop 84 of FIG. 6, to a "1" so that subsequent products formed between the T bit and X bit will be equal to the T bit. The data stored in bit A5 is shifted into register 42 when the A6 bit makes a transition between "0" and "1." Considering these operations in more detail, in FIG. 6 a "1" level in this bit position produces a ONE signal on conductor 144 which clears flip-flop 84. Also, a toggle pulse appears on conductor 103 (FIG. 7) for shifting register 42 to record the level on conductor 196.

OPERATIONAL PROGRAM FOR BASIC SYSTEM FUNCTIONS

The following is a set of sub-routines, each of which control the performance of specific circuit operations. The presented program must be operated in the order in which it appears herein. Changes, for example, to interpose new sub-routines, require re-examination of the initial conditions for succeeding sub-routines.

Insofar as it is possible, a brief discussion is inserted before groups of program instructions to indicate the function to be performed.

SUB-ROUTINE A: SCAN STATION SET

In this algorithm, data specifying the new state of station set ringer and lamps is received from connected service modules and transmitted to the station set in the following order: Ringer Lamp 6, Lamp 5, Lamp 4, Lamp 3, Lamp 2, and Lamp 1. In response to these signals, the station set will automatically return the following data in this order: Switch-Hook Status, Button 6, Button 5, Button 4, Button 3, Button 2, and Button 1. The incoming data is automatically shifted into Data Register 53 and compared bit by bit as it is received with the previously stored data in Data Register 53.

Before this operation can begin, the station module must be set to a specific set of initial conditions. To receive data from the service modules, the value of R bit (conductor 120) in Function Calculator 80 must initially be set to "1." The following instructions accomplish this purpose:

1.) X=1

2.) R=X+1 ∴ R=1, X=1

Before scanning operations begin, the code of button 6 (101) must be stored in the button register. The following set of instructions shift this code into Button Register 40, in order that the code is derived from the clock data in bit position A5 using instructions in the mode 01:

3.) CD → BR; CD=1

4.) CD → BR; CD=0

5.) CD → BR; CD=1 ∴ BR=101

The received data is compared with the stored data in register 56 to determine a mismatch; thus the mismatch flip-flop 57 must be cleared before data is transmitted. In addition, an instruction must be included for clearing flip-flop 51 of Data Receiver 50 before data is transmitted. The following instructions set these initial conditions:

6.) MISM=0

7.) RD=0

At this point, all initial conditions have been set and we may now proceed to determine whether a ringing signal should be transmitted to the station set. To make this determination, the status of all interconnected service modules must be ascertained.

8.) READ:ALL

The request for ringer signal at the station set is now stored in T bit flip-flop 93. Before it is transmitted to the station set, it is stored in the X bit and a request for modification signals, if any, is made. It is to be noted that all subsequent instructions will now be performed in the "11" mode.

9.) X=X·T

10.) READ:ALL

Modification signals, if any, are now stored in the T bit flip-flop 93 and the prior request for ringer signals is stored as the X bit in flip-flop 84. At this point, the ringer signal may be transmitted to the station set. Note that what is transmitted is the EXCLUSIVE-OR OF X AND T.

11.) TRANSMIT (Mode "11")

Let us assume for transmission of the remaining signals relating to lamp status button 6 through button 1 that they are to be made without modification. The X bit must be set to "0" and the data in the T bit is directly forwarded through Data Transmitter 70 to the station set. This data will be obtained one bit at a time utilizing codes stored in the button register to selectively receive intermodule signals. There is no initial update which will allow us to set X=0. X is set to 0 by selecting a variable known to be 0 and logically combining it with its complement in the Function Calculator 80. In this particular example, the T bit is selected. During this operation, all service modules are inhibited from transmitting data and therefore we are assured that a "0" level can be stored in the T bit flip-flop 93 with the first instruction.

12.) READ:ALL—X=X·T ("11" Mode)

13.) REPEAT INSTRUCTION NO. 12 ∴ T=0 and X=0

14.) READ:ONE—TRANSMIT—CD → BR; CD = 1 ("11" Mode) ∴ BR = 011

15.) REPEAT INSTRUCTION NO. 14 CD = 0 ∴ BR = 110

16.) REPEAT INSTRUCTION NO. 14 CD = 0 ∴ BR = 110

17.) REPEAT INSTRUCTION NO. 14 CD = 0 ∴ BR = 000

18.) REPEAT INSTRUCTION NO. 14 CD = 1 ∴ BR = 001

19.)
20.) [SEND TWO MODE 11 INSTRUCTIONS WITH NO FUNCTIONS CALLED FOR TO PROVIDE DELAY IN PROGRAM ALLOWING FOR RECEIPT OF LAST SIGNALS FROM STATION SET.

A mismatch between the received data and data stored in register 56 of FIG. 4 causes flip-flop 57 to be set.

SUB-ROUTINE B: STORE MISMATCH CONDITION IN R BIT

The following instructions set the R bit equal to "1" if MISM = 0. MISM = 0 occurs when consecutive data strings received from the station set are identical. If a mismatch occurs between received data and previously stored data, these instructions will set R = 0. Many of the instructions in the following sub-routines are conditioned upon R bit = 1.

21.) X = 1

22.) R = 0

23.) X = $\overline{MISM}$ · X

24.) R = X + R ∴ R = $\overline{MISM}$

SUB-ROUTINE C: UPDATE SWITCH-HOOK AND TIME-OUT CIRCUIT

The following instruction updates the switch-hook information stored in circuit 71 in the event the R bit is equal to "1." The latter occurs each time two consecutive scans match.

25.) If R = 1, UPDATE S.H.

SUB-ROUTINE D: ADVANCE SWITCH-HOOK AND TIME-OUT CIRCUIT

The next instruction is inserted at five second intervals in the program and unconditionally causes a pulse to be forwarded to circuit 71. The timed pulse advances the on-hook time out sequence which automatically selects a prime line in place of the line last used between 5 and 10 seconds after disconnect.

26.) UPDATE S.H.

SUB-ROUTINE E: DETERMINE BUTTON DEPRESSED

The following algorithm contains instructions for scanning data received from the station set and for concurrently circulating all button codes starting at the code of button No. 6 until a "1" is detected. The latter is detected by MISM = "1" and the circulation of codes is stopped at that point.

At the beginning and at the end of the sub-routine, instructions for setting the button register equal to the "No Connect" are sent. This is important because subsequent sub-routines are *not* conditioned on the detection of a code. Setting the register equal to "111" prevents false intermodule signals from being forwarded during these routines if no code is detected.

27.) BR = 111

28.) RD = 0

29) If R = 1 and MISM = 0, CD → BR; CD = 0

30.) If R = 1 and MISM = 0, DR → DR; CD → BR; CD = 1 ∴ BR = 101 (Button No. 6)

31.) If R = 1 and MISM = 0, CD → BR; CD = 1

32.) If R = 1 and MISM = 0, DR → DR; CD → BR; CD = 0 ∴ BR = 011 (Button No. 5)

33.) If R = 1 and MISM = 0, CD → BR; CD = 1

34.) If R = 1 and MISM = 0, DR → DR; CD → BR; CD = 1 ∴ BR = 110 (Button No. 4)

35.) If R = 1 and MISM = 0, CD → BR; CD = 0

36.) If R = 1 and MISM = 0, CD → BR; CD = 0

37.) If R = 1 and MISM = 0, CD → BR; CD = 0

38.) If R = 1 and MISM = 0, DR → DR; CD → BR; CD = 1 ∴ BR = 100 (Button No. 3)

39.) If R = 1 and MISM = 0, CD → BR; CD = 0

40.) If R = 1 and MISM = 0, CD → BR; CD = 0

41.) If R = 1 and MISM = 0, DR → DR; CD → BR; CD = 0 ∴ BR = 000 (Button No. 2)

42.) If R = 1 and MISM = 0, CD → BR; CD = 1

43.) If R = 1 and MISM = 0, CD → BR; CD = 0

44.) If R = 1 and MISM = 0, DR → DR; CD → BR; CD = 0 ∴ BR = 001 (Button No. 1)

45.) If R = 1 and MISM = 0, CD → BR; CD = 1

46.) If R = 1 and MISM = 0, CD → BR; CD = 1

47.) If R = 1 and MISM = 0, CD → BR; CD = 1

SUB-ROUTINE F: SEND BUTTON DEPRESSED SIGNAL

In this sub-routine, instructions are generated for controlling the transmission of a "1" via the service input-output circuit 66 to the service module corresponding to a "1" bit stored in register 56. In this manner, service modules are instructed that a station set has requested the service associated with that module. The signal is only sent at the time the button is depressed at the station set and only after the received station data has been verified. Note that during the previous subroutine the code for "No Connect" was stored in the event no key depression was detected. Therefore, there is no necessity to inhibit this operation, since there is no service module corresponding to the "No Connect" code.

48.) If R = 1, SEND:ONE

SUB-ROUTINE G: SEND BUTTON DEPRESSED IF OFF-HOOK

In this sub-routine, instructions are generated for controlling transmission of signals to service modules corresponding to keys depressed if the station is off-hook. The switch-hook status of the station set is stored in circuit 71 (FIG. 6). In particular, if flip-flops 72 and 73 are reset, the station set is off-hook. By storing the off-hook condition in the R bit, a signal is transmitted to the interconnected service module only if the station is off-hook, The following instructions store the value of $\overline{Y1}\cdot\overline{Y2}$ in the R bit.

49.) X = 1

50.) R = 0

51.) X = X · $\overline{Y1}$ ∴ X = $\overline{Y1}$

52.) X = X · $\overline{Y2}$ ∴ X = $\overline{Y2}\cdot\overline{Y1}$

53.) R = R + X ∴ R = $\overline{Y1}\cdot\overline{Y2}$

54.) If R = 1, SEND:ONE

SUB-ROUTINE H: SEND HOLD SIGNAL

This sub-routine contains instructions for determining whether a hold button was depressed and for sending a signal to the line module presently connected to that station set. Initially, it is determined if a connection is established; and if so established, the R bit is set to "1." Next, all hold modules send signals to the station module which is reading the signals at that time. Following this, the station module interprets the received information and sets the R bit to "1" if, in fact, the button depressed corresponds to a hold button. As a last step in the sub-routine, the button code corresponding to the station connected and stored in the memory register is put in the button register to control the input-output circuit 66 so that a signal can be transmitted indicating the hold condition.

55.) R = 0

56.) X = X · $\overline{NI}$ ∴ X = $\overline{Y2}\cdot\overline{Y1}\cdot\overline{NI}$ 57.) R = R + X ∴ R = $\overline{Y1}\cdot\overline{Y2}\cdot\overline{NI}$ 58.) If R = 1, READ:ONE Upon receiving the previous instruction, all hold modules transmit signals concurrently. If the button code corresponding to the one button depressed is a hold button, a "1" is stored in the T bit flip-flop 93.

59.) X = 1

60.) R = 0

61.) X = X · T

62.) $R=R+X \therefore R=T$

If R = 1, this is an indication that a hold button was depressed.

63.) If $R=1, \begin{bmatrix} MR \rightarrow BR \\ BR \rightarrow MR \end{bmatrix}$ 64.) SAME AS INSTRUCTION NO. 63
65.) SAME AS INSTRUCTION NO. 63
66.) If R = 1, SEND:ONE
67.) SAME AS INSTRUCTION NO. 63
68.) SAME AS INSTRUCTION NO. 63

SUB-ROUTINE I: CONNECTING STATION SET TO LINE MODULE

In this algorithm, instructions are generated for connecting the line module corresponding to the button depressed via the network of FIG. 5. However, before the connection is established, a signal is forwarded by the line module to the station module to allow the network connection.

69.) $X=1$
70.) $R=0$
71.) $X=X\cdot\overline{Y1} \therefore X=\overline{Y1}$
72.) $X=X\cdot\overline{Y2} \therefore X=\overline{Y2}\cdot\overline{Y1}$
73.) $R=R+X \therefore R=\overline{Y1}\cdot\overline{Y2}$
74.) If R = 1, READ:ONE T bit equals "1" if a connection should be made and equals "0" if no connection should be established. This bit is transmitted by the line module concurrently with the READ instruction.

75.) $R=0$
76.) $X=X\cdot T$
77.) $R=R+X \therefore R=\overline{Y1}\cdot\overline{Y2}\cdot T$
78.) If $R=1, \begin{bmatrix} MR \rightarrow BR \\ BR \rightarrow MR \end{bmatrix}$
79.) SAME AS INSTRUCTION NO. 78
80.) SAME AS INSTRUCTION NO. 78
81.) If R = 1, NI = 0

The last instruction causes the network connection to be established.

SUB-ROUTINE J: DISCONNECT SERVICE MODULE NETWORK PATH

The first set of instructions sets the network blocking flip-flop 213 (FIG. 5) and releases any existing connection upon detection of an on-hook condition. If the on-hook condition persists for more than five seconds, the code of the previously connected line stored in the memory register is replaced with the no-connect code, 111. The station set is on-hook if circuit variables $Y_1$ (flip-flop 73) and $Y_2$ (flip-flop 72) are both "1." Initially, therefore, the function $Y_1+Y_2$ must be solved.

82.) $R=0$
83.) $X=1$
84.) $X=Y_2\cdot X$
85.) $R=X+R$
86.) $X=1$
87.) $X=Y_1\cdot X$
88.) $R=X+Y_1 \therefore R=Y_2+Y_1$
89.) If R = 1, NI = 1

If the on-hook condition persists for more than 5 seconds, the product of variables $Y_1$ and $\overline{Y}_2$ is 1. If that condition is met, the code 111 is shifted into the button register 40 and eventually into memory register 46.

90.) $R=0$
91.) $MIS\underline{M}=0$
92.) $X=\overline{Y}_2\cdot X \therefore X=Y_1\cdot\overline{Y}_2$
93.) $R=R+X \therefore R=Y_1\cdot\overline{Y}_2$
94.) If R = 1 and MISM = 0; CD → BR; CD = 1
95.) If R = 1 and MISM = 0; CD → BR: CD = 1
96.) If R = 1 and MISM = 0; CD → BR: CD = 1
97.) If R = 1 and MISM = 0; BR → MR
98.) If R = 1 and MISM = 0; BR → MR
99.) If R = 1 and MISM = 0; BR → MR ∴ MR = Code 111

SUB-ROUTINE K: PRIME LINE/PREVIOUS LINE SELECTION

The following set of instructions is designed to connect the station set to the prime line (button code 000) or to a previously connected line depending upon the length of time the station set remained on-hook before initiating a new call. If the subscriber is on-hook for more than 5 seconds, then the prime line is selected.

The first set of instructions solves the functions $\overline{Y}_2\cdot\overline{Y}_1\cdot NI$ to determine if a new call request was made. It is initially assumed in the program that the previous line is to be used and, accordingly, the code of that line currently stored in the memory register is transferred to the button register if the solved function equals "1."

100.) $R=0$
101.) $X=1$
102.) $X=NI\cdot X$
103.) $X=\overline{Y}_1\cdot X$
104.) $X=\overline{Y}_2\cdot\overline{Y}_1\cdot X$
105.) $R=X \therefore R=\overline{Y}_2\cdot\overline{Y}_1\cdot NI$
106.) If R = 1, MR → MR, MR → BR
107.) If R = 1, MR → MR, MR → BR
108.) If R = 1, MR → MR, MR → BR Next solve the function $\overline{Y}_2\cdot\overline{Y}_1\cdot NI\cdot NC$ to determine if the caller was on-hook for greater than 5 seconds. If the function equals "1," then the prime line code, 000, replaces the code, 111, if it was previously stored in the button register.

109.) $R=0$
110.) $X=NC\cdot X$
111.) $R=X \therefore R=\overline{Y}_2\cdot\overline{Y}_1\cdot NI\cdot NC$
112.) If R = 1, CD → BR; CD = 0
113.) If R = 1, CD → BR: CD = 0
114.) If R = 1, CD → BR; CD = 0

At this point the button register has either the previously used line button code or the prime line button code. Before establishing the network connection, however, a signal is sent to the line module to verify that a connection can be made at this time. The answer is stored in the T bit. Before the signal can be sent, the R bit must be set to "1" and in anticipation of subsequent instructions the function $\overline{Y}_2\cdot\overline{Y}_1+NI$ is solved at this time to set R = 1.

115.) $R=0$
116.) $X=$
117.) $X=NI\cdot X$
118.) $X=\overline{Y}_2\cdot X$
119.) $X=Y_1\cdot\overline{Y}_2\cdot X$
120.) $R=X \therefore R=NI\cdot\overline{Y}_1\cdot\overline{Y}_2$
121.) If R = 1; SEND:ONE
122.) If R = 1; READ:ONE If the T bit is "1," no connection is made. A new function must be calculated at this time to determine further circuit action. If $\overline{T}\cdot\overline{Y}_2\,\overline{Y}_1\cdot NI$ equals "1," the network can be enabled and the button register can be shifted into the memory register.

123.) $R=0$
124.) $X=\overline{T}\cdot X$
1 125.) $R=X \therefore R=NI\cdot\overline{T}\cdot\overline{Y}_1\cdot\overline{Y}_2$ Before the connection is actually made, a final check is made to determine whether or not a connected line is ringing. These calls are given preference if the automatic ringing line connection feature (Sub-Routine L) is provided.

126.) If R = 1; READ:ALL

The T bit is set to "1" if any line is ringing.

127.) $R=0$
128.) $X=\overline{T}\cdot X$
129.) $R=X+R \therefore R=\overline{T}\cdot\overline{T}$ (previously calculated) $\cdot\,\overline{Y}_1\cdot\overline{Y}_2\cdot NI$ If R bit is equal to "1," the network connection can be made.

130.) If R = 1, BR → MR
131.) If R = 1, BR → MR
132.) If R = 1, BR → MR
133.) If R = 1, NI = 0 (Network enabled)

SUB-ROUTINE L: AUTOMATIC CONNECTION OF A RINGING LINE

TO AN OFF-HOOK STATION

The ensuring instructions locate ringing lines and connect those lines to an off-hook station set without the necessity for a button depression at the station set. The connection is, however, delayed so that the subscriber can avoid answering and thereby "tripping the ring" by depressing another line button.

134.) R=1

135.) READ:ALL (All lines in a ringing condition return a "1" signal which is logically combined and stored in the T bit.)

136.) X=1

137.) R=0

138.) $X=T \cdot X$

139.) $R=R+X \therefore R=T$

If R = 1, one of the connected lines is being rung. Next, determine whether any subscriber is off-hook and if so, add a "1" to the R bit.

140.) R=0

141.) $X=\overline{Y}_1 \cdot X$ ($\overline{Y}_1 \cdot \overline{Y}_2=1$ indicates off-hook)

142.) $X=\overline{Y}_2 \cdot \overline{Y}_1 \cdot X \cdot NC$

143.) $R=X \therefore R=T \cdot \overline{Y}_1\overline{Y}_2 \cdot NC$

The next condition to be ascertained is whether or not a button is depressed.

144.) R=0

145.) $X=\overline{MISM} \cdot X$ (MISM=1 if button depressed)

146.) $R=X \therefore R=\overline{MISM} \cdot \overline{Y}_2 \cdot \overline{Y}_1 \cdot T$ The next set of instructions selects one line if more than one line is being rung at the same time and ascertains the button code of that line. The code associated with the first ringing line is stored in the button register.

147.) If R=1, CD → BR; CD=1

148.) If R=1, CD → BR; CD=0

149.) If R = 1, CD → BR; CD = 0 ∴ BR = 001 (code of button No. 1)

150.) If R=1, READ:ONE

151.) R=0

152.) $X=\overline{T} \cdot X$ (T=1 if line No. 1 is ringing)

153.) $R=X \cdot \overline{MISM} \cdot \overline{Y}_2 \cdot \overline{Y}_1 \cdot \overline{T}$ This function is "0" if T added to previously calculated R bit is 0.

154.) If R = 1, CD →BR; CD 0 ∴ BR = 000 (code of button No. 2)

155.) If R=1, READ:ONE

156.) R=0

157.) $X=\overline{T} \cdot X$

158.) R=X

159.) If R = 1, CD → BR; CD = 1 ∴ BR = 100 (code of button No. 3)

160.) If R=1, READ:ONE

161.) R=0

162.) $X=\overline{T} \cdot X$

163.) R=X

164.) If R = 1, CD →BR; CD = 1 ∴ BR = 110 (code of button No. 4)

165.) If R=1, READ:ONE

166.) R=0

167.) $X=\overline{T} \cdot X$

168.) R=X

169.) If R = 1, CD BR; CD = 0 ∴ BR = 011 (code of button No. 5)

170.) If R=1, READ:ONE

171.) R=0

172.) $X=\overline{T} \cdot X$

173.) R=X

174.) If R = 1, CD → BR; CD = 1 ∴ BR = 101 (code of button No. 6)

175.) If R=1, READ:ONE

176.) R=0

177.) $X=\overline{T} \cdot X$

178.) R=X

The code of one of the ringing lines is now in button register 40 and the R bit = 0. However, R bit must be reset to "1" to utilize SEND instruction.

179.) X=1

180.) R=X

181.) If R = 1, SEND:ONE (This signal increments a counter of the line module to delay the connection.)

182.) READ:ONE (If the counter is now at a full count, a "1" signal is returned and stored in the T bit.)

183.) R=0

184.) X=1

185.) $X=T \cdot X$

186.) $R=R+X \therefore R=T$

187.) If R=1, BR → MR

188.) If R=1, BR → MR

189.) If R=1, BR → MR

190.) If R=1, NI=0

Return to Sub-Routine A, the first instruction.

SUMMARY

Additional station sets and lines may be added readily by the connection to the system of a station module for each added station set, a line module for each added CO/PBX line and appropriate cross-connection wiring in the service designation field. It is noteworthy that a connection to the six wire bus is sufficient to integrate the added module into the system operation.

While six-button station sets have been discussed in detail herein, additional lines may be provided at any station set, such as shown herein for set 3 by connection of a second and a third station module, each with the capability of processing six additional lines for that station set.

Other aspects of the system disclosed herein are described and claimed in the copending applications of Knollman, Ser. No. 43,812 and Knollman-Simon, Ser. No. 43,813 filed on the same day as this application.

What is claimed is:

1. In a key telephone system, a plurality of communication lines and a key station having a plurality of non-locking buttons each associated with individual ones of said lines, means for determining the switchhook status of said station, means storing the identity code of the one of said lines last connected to said station, and means responsive to said determining means upon the determination that the switchhook status is off-hook for automatically connecting said station to said last connected line without the necessity for depressing the button associated therewith.

2. The invention recited in claim 1 further including means associated with said last connected line for determining the idle-busy status thereof, and means for inhibiting the automatic connection of an off-hook of one said stations by said connecting means in the event said last connected line is busy.

3. The invention set forth in claim 1 further including means for timing a prescribed interval that said station switchhook status is on-hook, means for controlling the connection of said station to a prime one of said lines without the necessity for a button depression, and means controlled by said timing means for inhibiting a connection to the line whose identity is stored in said storing means.

4. The invention set forth in claim 3 further including means actuated after said prescribed interval by said timing means for replacing the identity code of said last connected line with the identity code of said prime line in said storing means.

5. The invention recited in claim 3 further including means detecting an unanswered incoming call on any one of lines connected to said station for preventing an automatic connection to said last connected line and to said prime line.

6. In a key telephone system, a plurality of communication lines and a key station having a plurality of buttons each associated with individual ones of said lines, means for determining the switchhook status of said station, means responsive to depression of any one of said buttons for controlling the connection of one of said lines associated with said depressed button to said station, and means responsive to said determining means upon ascertaining that said station is off-hook with no button depressed for automatically connecting said station to a prescribed one of said lines without the necessity for depressing the button associated therewith and for disabling said controlling means.

7. The invention described in claim 6 further including means storing the identification code of one of said lines last connected to said station for controlling said connecting means to connect said station thereto.

8. The invention set forth in claim 7 further including means for timing a prescribed period said station is on-hook, and means responsive after said prescribed period for changing the identification code in said storing means to that of a prime one of said lines.

9. A program controlled key telephone system having a plurality of communication lines, a multi-button station set, a plurality of line modules and station modules connected to a source of cyclically generated instruction signals, means in each said station module controlled by said instruction signals for periodically scanning said station set for switchhook status and button depressions;

means in each station module for storing an identity code for one of said lines;

a switching network in each said module for selectively connecting said set to any of said line modules associated with said lines; and means in each said station module controlled by said signals for controlling said network to establish a connection from said set via one of said line modules to the one of said lines corresponding to the stored code, without the necessity for a button depression, as soon as said station goes off-hook.

10. The invention recited in claim 9 wherein said station module includes means controlled by said signals to temporarily store in said storing means the code of one of said lines last connected to said station, and said station module also includes means controlled by said signals if said set remains on-hook for a prescribed period for replacing said code of said last connected line in said storing means with a code of a preferred one of said lines.

11. In combination in a key telephone system, a plurality of communication lines, a station set including a plurality of line pick-up keys thereat, each of said lines being associated with individual ones of said keys, means for determining the on-hook and off-hook status of said set, means for detecting depression of one of said keys, means temporarily storing the code of the one of said lines last connected to said set, means for erasing said code when the on-hook status of said set persists for longer than a prescribed interval, means responsive to said erasing means for storing the code of a different one of said lines, and, means controlled when an off-hook status and no key depression is detected for connecting said set to the one of said lines corresponding to the code in said storing means.

12. In a key telephone system, a plurality of lines from a switching office connected to a station module, a station set associated with said module, means generating a continuous stream of binary encoded instruction signals, a data path connecting said instruction signals to said module, a communication path connecting said station set to said module, means sending an indication signal to said module when said station set initially goes off-hook and means actuated by said indication signal and directed by said instruction signals to connect a prescribed one of said lines to said communication path.

* * * * *

UNITED STATES PATENT OFFICE

CERTIFICATE OF CORRECTION

Patent No. 3,660,611 Dated May 2, 1972

Inventor(s) D. J. H. Knollman, R. F. Metz, H. L. Reynolds

It is certified that error appears in the above-identified patent and that said Letters Patent are hereby corrected as shown below:

Col. 2, line 71, before "the" insert --and--.
Col. 11, line 8, in the last column, change "1" to --0--.
Col. 13, line 57, before "are" change "states" to --stages--.
Col. 15, line 38, before "signal" change "s" to --a--.
Col. 20, line 75, between "CD" and "BR" insert --→--.
Col. 26, line 44, after "116.) X =" insert --1--;
line 59, before "125.)" delete the "1".
Col. 27, line 45, after "CD" second occurrence, insert an equal sign;
line 64, after "CD" first occurrence, insert --→--.
Col. 28, line 54, after "off-hook" change "of one" to --one of--.

Signed and sealed this 12th day of September 1972.

(SEAL)
Attest:

EDWARD M.FLETCHER,JR.
Attesting Officer

ROBERT GOTTSCHALK
Commissioner of Patents

ORM PO-1050 (10-69)

USCOMM-DC 60376-P69
★ U.S. GOVERNMENT PRINTING OFFICE : 1969 O—366-334